(12) United States Patent
Inoue

(10) Patent No.: US 6,704,762 B1
(45) Date of Patent: Mar. 9, 2004

(54) MULTIPLIER AND ARITHMETIC UNIT FOR CALCULATING SUM OF PRODUCT

(75) Inventor: Toshiaki Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/385,357

(22) Filed: Aug. 30, 1999

(30) Foreign Application Priority Data

Aug. 28, 1998 (JP) .......................................... 10-242754

(51) Int. Cl.[7] ................................................. G06F 7/52
(52) U.S. Cl. ......................... 708/628; 708/625; 708/630
(58) Field of Search ........................ 708/625, 627–630, 708/518

(56) References Cited

U.S. PATENT DOCUMENTS

| | | | | |
|---|---|---|---|---|
| 4,825,401 A | * | 4/1989 | Ikumi ........................... | 708/625 |
| 5,189,636 A | * | 2/1993 | Patti et al. ................... | 708/518 |
| 5,446,651 A | * | 8/1995 | Moyse et al. ................ | 708/630 |
| 5,586,070 A | * | 12/1996 | Purcell ........................ | 708/518 |
| 5,751,618 A | | 5/1998 | Abiko et al. | |
| 5,751,622 A | * | 5/1998 | Purcell ........................ | 708/518 |
| 5,880,985 A | * | 3/1999 | Makineni et al. ........... | 708/518 |
| 6,249,799 B1 | * | 6/2001 | Purcell et al. ............... | 708/627 |
| 6,286,024 B1 | * | 9/2001 | Yano et al. .................. | 708/518 |

FOREIGN PATENT DOCUMENTS

| | | |
|---|---|---|
| JP | 59-149540 | 8/1984 |
| JP | 4-142619 | 5/1992 |
| JP | 7-121354 | 5/1995 |
| JP | 7-234778 | 9/1995 |
| JP | 8-292876 | 11/1996 |

* cited by examiner

Primary Examiner—Tan V. Mai
(74) Attorney, Agent, or Firm—Foley & Lardner

(57) ABSTRACT

In a case of performing a multiplication operation with low accuracy, a value of the most significant bit included in the least significant half the bits of a multiplier is replaced with "0". A Booth decoder divides the multiplier into a plurality of partial bit rows. A plurality of partial product generating circuits, each of which is arranged corresponding to corresponding one of the partial bit rows divided by the Booth decoder, each generates a partial product of a multiplicand and each corresponding one of the partial bit rows. In the case of performing the multiplication operation with low accuracy, the partial product generating circuits generating the partial products corresponding to the partial bit row of the least significant half the bits, generate partial products of each corresponding bit row and the least significant half the bits of the multiplicand, and generate partial products of each corresponding bit row and the most significant half the bits of the multiplicand. The partial products, which are generated by the plurality of partial product generating circuits generate, are added by means of adders which are separately arranged for corresponding to either the most significant half the bits or the least significant half the bits. In the case of performing the multiplication operation with low accuracy, a carry signal which is generated by adding the least significant half the bits of the partial products is not input in the adder being in charge of adding the most significant half the bits.

17 Claims, 9 Drawing Sheets

FIG. 4A $$\begin{array}{r}
= +62 \\
\text{MULTIPLIER Y} = 0\ 0\ 1\ 1\ 1\ 1\ 1\ 0 \\
= -51 \\
\times)\ \text{MULTIPLICAND X} = 1\ 1\ 0\ 0\ 1\ 1\ 0\ 1 \\
\hline
0\ 0\ 1\ 1\ 0\ 0\ 1\ 1\ 0 \\
0\ 0\ 0\ 0\ 0\ 0\ 0\ 0(0\ 0) \\
0\ 0\ 0\ 0\ 0\ 0\ 0\ 0(0\ 0\ 0\ 0) \\
+)\quad 1\ 1\ 0\ 0\ 1\ 1\ 0\ 1(0\ 0\ 0\ 0\ 0\ 0) \\
\hline
1\ 1\ 0\ 0\ 1\ 1\ 1\ 0\ 1\ 0\ 0\ 1\ 1\ 0 \\
= -3162
\end{array}$$

← PARTIAL PRODUCT GENERATING CIRCUIT 101
← PARTIAL PRODUCT GENERATING CIRCUIT 102
← PARTIAL PRODUCT GENERATING CIRCUIT 103
← PARTIAL PRODUCT GENERATING CIRCUIT 104

(MULTIPLICATION OPERATION WITH EIGHT BIT ACCURACY)

FIG. 4B $$\begin{array}{r}
=+3 \quad\quad =-2 \\
\text{MULTIPLIER Y} = 0\ 0\ 1\ 1\ |\ 1\ 1\ 1\ 0 \\
=-4 \quad\quad =-3 \\
\times)\ \text{MULTIPLICAND X} = 1\ 1\ 0\ 0\ |\ 1\ 1\ 0\ 1
\end{array}$$

PARTIAL PRODUCTS OF LEAST SIGNIFICANT BIT WARD
+) 
$$\begin{array}{r}
0|0\ 0\ 0\ 0\ 0\ 1\ 1\ 0 \\
0\ 0|0\ 0\ 0\ 0\ 0\ 0
\end{array}$$
← PARTIAL PRODUCT GENERATING CIRCUIT 101
← PARTIAL PRODUCT GENERATING CIRCUIT 102

$$\begin{array}{r}
(0\ 0\ 0\ 0)0\ 1\ 0\ 0|0\ 0\ 0\ 0 \\
+)\quad (1\ 1)1\ 1\ 0\ 0\ 0\ 0|0\ 0 \\
\hline
1\ 1\ 1\ 1\ 0\ 1\ 0\ 0|0\ 0\ 0\ 0\ 0\ 1\ 1\ 0 \\
=-12 \quad\quad =+6
\end{array}$$

PARTIAL PRODUCTS OF MOST SIGNIFICANT BIT WARD
← PARTIAL PRODUCT GENERATING CIRCUIT 103
← PARTIAL PRODUCT GENERATING CIRCUIT 104

(TWO MULTIPLICATION OPERATIONS WITH FOUR BIT ACCURACY)

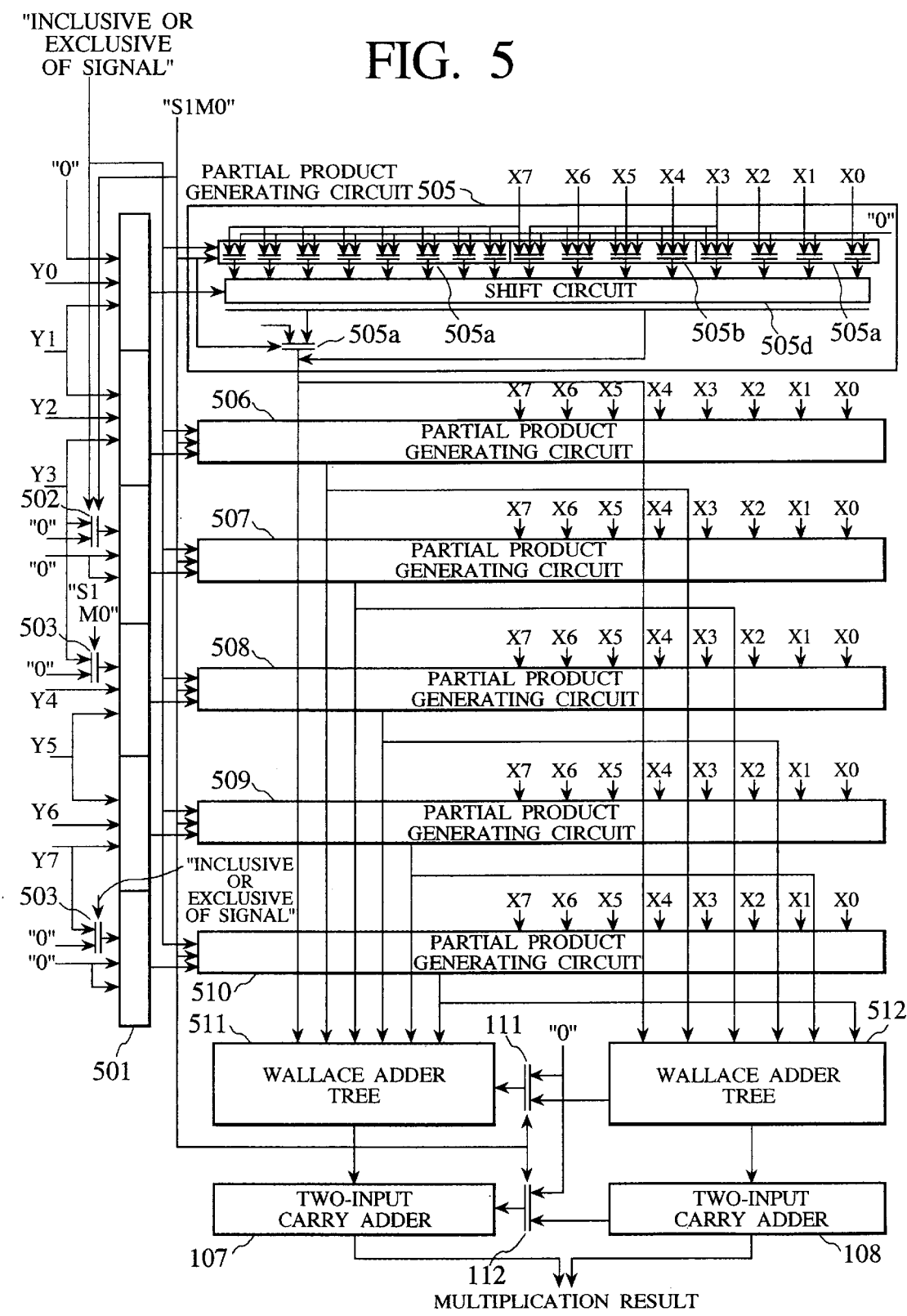

FIG. 6A

```
                              = 62
    MULTIPLIER Y   = (0 0) 0 0 1 1 1 1 1 0
                              = 205
 x) MULTIPLICAND X = (0 0) 1 1 0 0 1 1 0 1
    ─────────────────────────────────────
              (1 1 1 1 1 1 1) 0 0 1 1 0 0 1 1 0   ← PARTIAL PRODUCT GENERATING CIRCUIT 505
                              0 0 0 0 0 0 0 0 0 0 ← PARTIAL PRODUCT GENERATING CIRCUIT 506
                              0 0 0 0 0 0 0 0 0 0 ← PARTIAL PRODUCT GENERATING CIRCUIT 507
                              0 0 0 0 0 0 0 0 0 0 ← PARTIAL PRODUCT GENERATING CIRCUIT 508
                          (0 0) 1 1 0 0 1 1 0 1   ← PARTIAL PRODUCT GENERATING CIRCUIT 509
                              0 0 0 0 0 0 0 0     ← PARTIAL PRODUCT GENERATING CIRCUIT 510
    ─────────────────────────────────────
              0 0 1 1 0 0 0 1 1 0 1 0 0 1 1 0
                              = 12710
```

(MULTIPLICATION OPERATION WITH EIGHT BIT ACCURACY)

FIG. 6B

```
                         = 3    | = 14
    MULTIPLIER Y   = (0 0) 0 0 1 1 | 1 1 1 0
                         = 12   | = 13
 x) MULTIPLICAND X = (0 0) 1 1 0 0 | 1 1 0 1
    ─────────────────────────────────────
 PARTIAL PRODUCTS OF     0 0 | 1 1 1 0 0 1 1 0   ← PARTIAL PRODUCT GENERATING CIRCUIT 505
 LEAST SIGNIFICANT
 BIT WARD      0 0 0 0 | 0 0 0 0 0 0             ← PARTIAL PRODUCT GENERATING CIRCUIT 506
             0 0 0 0 0 0 | 1 0 1 1               ← PARTIAL PRODUCT GENERATING CIRCUIT 507
    ─ ─ ─ ─ ─ ─ ─ ─ ─ ─ ─ ─ ─ ─ ─ ─ ─
         (1 1 1 1) 0 1 0 0 | 0 0 0 0             ← PARTIAL PRODUCT GENERATING CIRCUIT 508
           (0 0) 1 1 0 0 0 0 | 0 0   PARTIAL     ← PARTIAL PRODUCT GENERATING CIRCUIT 509
                                     PRODUCTS OF
           0 0 0 0 0 0 0 0      MOST SIGNIFICANT ← PARTIAL PRODUCT GENERATING CIRCUIT 510
                                     BIT WARD
    ─────────────────────────────────────
           0 0 0 1 0 1 0 0 | 1 0 0 1 0 1 1 0
              = 36            = 182
```

(TWO MULTIPLICATION OPERATIONS WITH FOUR BIT ACCURACY)

MULTIPLIER AND ARITHMETIC UNIT FOR CALCULATING SUM OF PRODUCT

BACKGROUND OF THE INVENTION

1. Field of the Invention

The present invention relates to a multiplier and an arithmetic unit for calculating a sum of products, both of which are preferred to apply to a processor.

2. Description of the Related Art

General-purpose processors, in recent years, mostly tend to include a multiplier applying partial product generation with using a Booth's algorithm and partial product addition by means of a carry save method. For relatively low cost processors for computers, there has been a great increase in the proportion of multiplication operations with a low degree of accuracy, in terms of approximately sixteen bits, mainly for signal processing, for example, image processing or the like, in addition to multiplication operations with a high degree of accuracy, in terms of thirty two or sixty four bits.

For the sake of reduction in the number of parts embodied in the calculation systems, recently, general-purpose processors are intended to carry out signal processing, which has conventionally been executed by a special-purpose processor, such as a DSP (Digital Signal Processor), etc. This means that the general-purpose processors need to have a function for executing a multiplication operation with a low degree of accuracy, in terms of sixteen bits. Because the large amount of data is handled in the signal processing, such as the image processing or the like, processors for performing such signal processing are required to have a function for executing a multiplication operation with a low degree of accuracy with high efficiency.

FIG. 8 illustrates the first example of a multiplier according to the conventional techniques. The multiplier shown in FIG. 8 comprises two multipliers 801a and 801b for performing multiplication operations with "sixteen bit accuracy", a sixty four bit adder 802, a sixty four bit register 803, selectors 804a, 804b, and an input selector 805 for sending data to an adder 804.

In this multiplier, thirty two bit data A including the sixteen most significant bits (a1) and the sixteen least significant bits (a2), and thirty two bit data B including the sixteen most significant bits (b1) and the sixteen least significant bits (b2) are given as input data. In a case of performing two multiplication operations with the "sixteen bit accuracy", in the multiplier, each set of the bits a1, a2, b1, and b2 is assumed as independent sixteen bit data. In this case, data including combinations of (a1, b1) and (a2, b2) are supplied to a corresponding one of the sixteen bit multipliers 801a and 801b, respectively, by controlling the selectors 804a and 804b. Now, each of the multipliers 801a and 801b concurrently outputs corresponding solution of (a1×b2) and (a2×b2) each as a multiplication result thereof.

In a case of performing a multiplication operation for calculating (A×B) with "thirty two bit accuracy", the multiplier makes the multipliers 801a and 801b calculate (a1×b2) and (a2×b1) by controlling the selectors 804a and 804b. The adder 802 adds the calculation results and generates an intermediate result (a1×b2+a2×b1), and stores the generated result in the register 803. Now, the multiplier makes the multiplier 801a calculate (a1×b1), and makes the selector 805 output the value stored in the register 803. The adder 802 adds the output from the multiplier 801a and the output from the selector 805, and stores its resultant addition (a1×b2+a2×b1+a1×b1) in the register 803 as a new intermediate result. The adder 802 adds the new intermediate result with a multiplication result (a2×b2), and outputs the ultimate multiplication result (a1×b2+a2×b1+a1×b1+a2×b2).

The multiplier shown in FIG. 8 may carry out two multiplication operations with the "sixteen bit accuracy" as well as a multiplication operation with "thirty two bit accuracy". However, in the conventional multipliers, problematic performance is recognized in that multiplication operations are performed with low efficiency (especially, in the calculation time) with the "thirty two bit accuracy", since the multipliers need to generate an intermediate result at least twice in the case of performing the multiplication operation with the "thirty two bit accuracy".

FIG. 9 illustrates the second example of a conventional multiplier. The multiplier shown in FIG. 9 comprises a "thirty two bit" multiplier 901, and two "sixteen bit" multipliers 902a and 902b. The conventional multiplier has such a structure so as to simultaneously execute two multiplication operations with the "sixteen bit accuracy", and execute a multiplication operation with the "thirty two bit accuracy" at high speed. However, in such a conventional multiplier, a problematic matter arises in that hardware becomes large in its scale, for the multiplier needs to include a multiplier with high accuracy, in addition to two multipliers with low accuracy.

As disclosed in Unexamined Japanese Patent Application KOKAI Publication No. H7-121354, a multiplier performs multiplication operations with high accuracy (double accuracy), multiplication operations with low accuracy (single accuracy), and calculations for obtaining inner products, and further multiplication operations for multiple prime numbers, by modifying a Booth's algorithm. However, in this multiplier, a problematic matter arises in that no means for simultaneously executing multiplication operations with low accuracy is included, so that it is required a calculation time as the same as executing multiplication operations with high accuracy, for executing a set of multiplication operations with the low accuracy.

SUMMARY OF THE INVENTION

An object of the present invention is to provide a multiplier capable of executing multiplication operations with high accuracy at high speed, capable of executing a plurality of multiplication operations with low accuracy, and capable of attaining reduction of hardware scale.

Another object of the present invention is to provide an arithmetic unit, for calculating a sum of products, capable of executing a plurality of calculations with low accuracy, and capable of calculating a sum of products at high speed.

In order to achieve the above-described objects, according to the first aspect of the present invention, there is provided a multiplier for executing a multiplication operation using a Booth's algorithm, comprising:

a Booth decoder which divides a multiplier (Y) into a plurality of partial bit rows and outputs the divided bit rows;

a first multiplier replacing circuit which replaces, with "0", a value of a most significant bit (Y3) included in least significant half of bits of the multiplier (Y) in accordance with a first control signal (SIMD), so as to replace, with "0", a predetermined bit included in the plurality of bit row;

a plurality of partial product generating circuits each of which is arranged in a manner corresponding to each corresponding one of the partial bit rows divided by the Booth decoder, and generates a partial product, represented in bits which are twice as many as a bit number of a multiplicand, of the multiplicand (X) and each corresponding partial bit row;

a first adder which adds bit rows including the least significant half of bits of the partial products generated by the plurality of partial product generating circuits;

a second adder which adds bit rows including most significant half of bits of the partial product generated by the plurality of partial product generating circuits, in consideration of one or more carry signals; and a carry selecting circuit which selects either a bit row composed of "0" or one or more carry signals which the first adder outputs, in accordance with the first control signal (SIMD), and supplies, to the second adder, the selected data as one or more carry signals;

wherein each of the partial product generating circuit, which generates the partial product corresponding to the least significant half the bits included in the partial bit rows divided by the Booth decoder, and generates either partial product of full bits of the multiplicand (X) and each corresponding partial bit row or of the least significant half of bits of the multiplicand (X) and each corresponding bit row in accordance with a first select signal (SIMD), and each of the partial product generating circuit, which generates the partial product corresponding to the most significant half the bits included in the partial bit rows divided by the Booth decoder, generates either partial product of full bits of the multiplicand (X) and each corresponding partial bit row or of the most significant half the bits of the multiplicand (X) and each corresponding bit row in accordance with the first control signal (SIMD).

Thus, the multiplier of the present invention can perform a multiplication operation with high accuracy and two multiplication operations with low accuracy. Besides, the multiplier of the present invention is not required to retain an intermediate result for performing the multiplication operation with high accuracy. Accordingly, the multiplier of the present invention parallelly executes two multiplication operations with low accuracy, and executes a multiplication operation at high speed with high accuracy, while attaining reduction of hardware in its scale.

In the above-described multiplier, each of the partial product generating circuits which generates the partial product corresponding to the least significant half the bits included in the partial bit rows divided by the Booth decoder may include:

a first multiplicand replacing circuit which replaces each of the most significant half the bits of the multiplicand (X) with a value of a most significant bit included in the least significant half the bits in accordance with the first control signal (SIMD); and partial product replacing circuits, each of which replaces, with "0", each value of the most significant half the bits as a multiplication result in which the multiplicand (X) is multiplied by each corresponding partial bit row, in accordance with a first control signal (SIMD).

Each of the partial product generating circuits, which generates the partial product corresponding to the most significant half the bits included in the partial bit rows divided by the Booth decoder, may include a second multiplicand replacing circuit which replaces, with "0", each value of the least significant half the bits of the multiplicand (X) in accordance with the first control signal (SIMD).

In such a structure, in a case where the first control signal (SIMD) is to indicate either multiplication operation of obtaining, with high accuracy, a product of a value represented in full bits of the multiplier and a value represented in full bits of the multiplicand, or of obtaining, with low accuracy, a product of a value represented in the most significant half the bits of the multiplier and a value represented in the most significant half the bits of the multiplicand and a product of a value represented in the least significant half the bits of the multiplier and a value represented in the most significant half the bits of the multiplicand, the first multiplier replacing circuit may replace, with "0", a value of the most significant bit (Y3) included in one bit row of the least significant half the bits of the multiplier (Y), when the first control signal indicates a multiplication operation with low accuracy;

the first multiplicand replacing circuit may replace each of the most significant half the bits of the multiplicand (X) with a value of a most significant bit included in the least significant half the bits, when the first control signal indicates a multiplication operation with low accuracy;

each of the partial product replacing circuits may replace, with "0", each value of the most significant half the bits of a multiplication result in which the multiplicand (X) is multiplied by each corresponding partial bit row, when the first control signal indicates a multiplication operation with low accuracy;

the second multiplicand replacing circuit may replace, with "0", each value of the least significant half the bits of the multiplicand (X), when the first control signal indicates a multiplication operation with low accuracy; and each of the carry selecting circuit selects and outputs the carry signals output by the first adder when a first control signal (SIMD) indicates a multiplication operation with high accuracy, and selects and outputs the bit row composed of "0" when the first control signal (SIMD) indicates a multiplication operation with low accuracy.

In the above-described multiplication circuit, the first adder may include:

a first Wallace adder tree which calculates sum signals and carry signals of digits of the partial products generated by the plurality of partial product generating circuits; and a first carry adder which adds the sum signals and the carry signals of the digits of the partial products which are calculated by the first Wallace adder tree, in a manner corresponding to each digit.

The second adder may comprise:

a second Wallace adder tree which calculates sum signals and carry signals of digits of the partial products generated by the plurality of partial product generating circuits, in consideration of the carry signals; and a second carry adder which adds the sums and the carry signals of the digits of the partial products generated by the plurality of partial product generating circuits in a manner corresponding to each digit, in consideration of the carry signals.

The carry selecting circuit may comprise:

one or more selectors which select either "0" or a carry signal of one or more digits which the first Wallace adder tree outputs, and supply selected data to the second Wallace adder tree; and a selector which selects either "0" or the carry signal which the first carry adder outputs, and supplies selected data to the second carry adder.

The above-described multiplier may further comprise a second multiplier replacing circuit which replaces, with "0", a value of a predetermined bit of the multiplicand (X) in accordance with a second control signal (FUGOU-UMU) indicating whether to handle the multiplier (Y) and the multiplicand (X) as including a sign or not including any sign, so as to replace one or more values of one or more predetermined bits included in the plurality of partial bit rows, with "0".

In this case, the plurality of partial product generating circuits may generate either partial product of the multiplicand which is handled as a value with including a sign or of the multiplicand which is handled as a value without including any sign.

In such a case, each of the partial product generating circuits which generates the partial product corresponding to the least significant half the bits included in the partial bit rows divided by the Booth decoder may comprise:

a third multiplicand replacing circuit which replaces each of the most significant half the bits of the multiplicand with a value of the most significant bit included in the least significant half the bits or with the bit row composed of "0", in accordance with the first and second control signals; and a first multiplicand expanding circuit which expands the multiplicand in its bit number by adding the multiplicand and the bit row composed of "0" or a value of the most significant bit of the multiplicand in accordance with the second control signal.

Each of the partial product generating circuits which generates the partial product corresponding to the most significant half the bits included in the partial bit rows divided by the Booth decoder may comprise:

a fourth multiplicand replacing circuit which replaces, with "0", each value of the least significant half the bits of the multiplicand (X) in accordance with the first control signal; and a second multiplicand expanding circuit which expands the multiplicand in its bit number by adding the multiplicand and the bit row composed of "0" or a value of the most significant bit of the multiplicand in accordance with a second control signal.

In the structure of the above, the second multiplier replacing circuit may replace, with "0", a value of a predetermined bit (Y3) of the multiplier (Y) when the second control signal (FUGOU) indicates to handle the multiplier and the multiplicand as including a sign; and the third multiplicand replacing circuit may replace each of the most significant half the bits of the multiplicand with a value of the most significant bit included in the least significant half the bits, when the first control signal indicates a multiplication operation with low accuracy and the second control signal indicates to handle the multiplier and the multiplicand as including a sign, and may replace each of the most significant half the bits of the multiplicand with the bit row composed of "0", when the first control signal indicates a multiplication operation with low accuracy and the second control signal indicates to handle the multiplier and the multiplicand as not including any sign;

the fourth multiplicand replacing circuit may replace, with "0", each value of the least significant half the bits of the multiplicand (X), when the first control signal indicates a multiplication operation with low accuracy; and the first and the second multiplicand expanding circuits may expand the multiplicand in its bit number by adding the multiplicand and the bit row including a value of the most significant bit of the multiplicand, when the second control signal indicates to handle the multiplier and the multiplicand as including a sign, and expand the multiplicand in its bit number by adding the multiplicand and the bit row composed of "0", when the second control signal indicates to handle the multiplier and the multiplicand as not including any sign.

In order to achieve the above-described objects, according to the second aspect of the present invention, there is provided an arithmetic unit which obtains a sum of products and adds multiplication results executed with using a Booth's algorithm, comprising:

a Booth decoder which divides a multiplier (Y) into a plurality of partial bit rows and outputs the divided partial bit rows;

a first multiplier replacing circuit which replaces, with "0", a value of a most significant bit (Y3) included in the bit row of least significant half of bits of a multiplier (Y) in accordance with a first control signal (SIMD), so as to replace, with "0", a predetermined bit included in the plurality of the partial bit rows;

a plurality of partial product generating circuits, each of which is arranged in a manner corresponding to each corresponding one of the partial bit row divided by the Booth decoder, generates a partial product, represented in bits which are twice as many as a bit number of the multiplicand (X), of a multiplicand (X) and each partial bit row;

a first sum-of-product retaining circuit which retains a sum of products corresponding to the least significant half the bits of the partial products generated by the plurality of partial product generating circuits;

a second sum-of-product retaining circuit which retains a sum of products corresponding to most significant half the bits of the partial products generated by the plurality of partial product generating circuits;

a first adder which adds the bit rows of the least significant half the bits of the partial products generated by the plurality of partial product generating circuits, together with the sum of the products which is retained by the first sum-of-product retaining circuit;

a second adder which adds the bit rows of the most significant half the bits of the partial products generated by the plurality of partial product generating circuits, together with the sum of the products which is retained by the second sum-of-product retaining circuit, in consideration of a carry signal; and carry selecting circuits each of which selects either a carry signal output by the first adder or a bit row composed of "0" in accordance with the first control signal (SIMD), and supplies the selected data as one or more carry signals to the second adders, wherein each of the partial product generating circuits, which generates the partial product corresponding to the least significant half the bits of the partial bit rows divided by the Booth decoder, generates either partial product of each corresponding partial bit row and full bits of the multiplicand (X) or of each corresponding bit row and the least significant half the bits of the multiplicand (X) in accordance with a first select signal (SIMD), and each of the partial product generating circuits, which generates the partial product corresponding to the most significant half the bits of the partial bit rows divided by the Booth decoder, generates either partial product of each corresponding partial bit row and full bits of the multiplicand (X) or of each corresponding partial bit row and the most significant half the bits of the multiplicand (X) in accordance with the first control signal (SIMD).

Such a arithmetic unit can perform an arithmetic operation for obtaining a sum of products with high accuracy, and two arithmetic operations for obtaining a sum of products with low accuracy. Further, it is not required to retain data representing an intermediate result but the so-far-obtained sum of products, for performing a calculation for obtaining the sum of products with high accuracy. Therefore, the arithmetic unit for calculating the sum of products can simultaneously execute two arithmetic operations for obtaining a sum of products with low accuracy, and can execute an arithmetic operation for obtaining a sum of products with high accuracy at high speed.

In the above-described arithmetic unit for obtaining a sum of products, each of the partial product generating circuits, which generates the partial product corresponding to the least significant half the bits included in the partial bit rows divided by the Booth decoder, may include a first multiplicand replacing circuit which replaces each of the most significant half the bits of the multiplicand (X) with a value of a most significant bit included in the least significant half the bits, in accordance with the first control signal (SIMD), partial product replacing circuits which replaces, with "0", each value of the most significant half the bits representing a multiplication result in which the multiplicand (X) is multiplied by each corresponding bit row in accordance with the first control signal (SIMD).

Each of the partial product generating circuits, which generates the partial product corresponding to the most significant half the bits included in the partial bit rows divided by the Booth decoder, may include a second multiplicand replacing circuit which replaces, with "0", each value of the least significant half the bits of the multiplicand (X) in accordance with the first control signal (SIMD).

In such a structure, in a case where the first control signal (SIMD) is to indicate either multiplication operation of calculating, with high accuracy, a product of a value represented in full bits of the multiplier and a value represented in full bits of the multiplicand, or of calculating, with low accuracy, a product of a value represented in the most significant half the bits of the multiplier and a value represented in the most significant half the bits of the multiplicand and a product of a value represented in the least significant half the bits of the multiplier and a value represented in the most significant half the bits of the multiplicand;

the first multiplier replacing circuit may select and output "0", when the first control signal indicates a multiplication operation with low accuracy;

the first multiplier replacing circuit may replace each of the most significant half the bits of the multiplier (X) with a value of a most significant bit included in the least significant half the bits, when the first control signal indicates a multiplication operation with low accuracy;

each of the partial product replacing circuits may replace, with "0", each value of the most significant half the bits of a multiplication result in which the multiplicand (X) is multiplied by each corresponding partial bit row, when the first control signal indicates a multiplication operation with low accuracy;

the second multiplicand replacing circuit may replace, with "0", the least significant half the bits of the multiplicand (X), when the first control signal indicates a multiplication operation with low accuracy; and the carry selecting circuit may select and output carry signals which the first adder outputs, when the first control signal (SIMD) indicates a multiplication operation with high accuracy, and may select and output the bit row composed of "0", when the first control signal (SIMD) indicates a multiplication operation with low accuracy.

The above-described arithmetic unit for obtaining a sum of products may further comprise second multiplier replacing circuits each of which replaces, with "0", a value of a predetermined bit of the multiplier (Y), in accordance with a second control signal (FUGOU-UMU) indicating whether to handle the multiplier (Y) and multiplicand (X) as including or not including a sign, so as to replace a value of a predetermined bit included in the plurality of partial bit rows, with "0".

In this case, each of the plurality of partial product generating circuits may generate either partial product of a multiplicand which is handled as including a sign or of a multiplicand which is handled as not including any sign, in accordance with the second control signal.

In the above-described case, each of the partial product generating circuits, which generates the partial product corresponding to the least significant half the bits included in the partial bit rows divided by the Booth decoder, may include a third multiplicand replacing circuit which replaces each of the most significant half the bits of the multiplicand with the bit row composed of "0" or a value of a most significant bit included in the least significant half the bits, and a first multiplicand expanding circuit which expands the multiplicand in its bit number by adding the multiplicand and the bit row composed of "0" or a value of a most significant bit of the multiplicand in accordance with the second control signal.

Each of the partial product generating circuit, which generates the partial product corresponding to the most significant half the bits included in the partial bit rows divided by the Booth decoder may include a fourth multiplicand replacing circuit which replaces, with "0", each value of the least significant half the bits of the multiplicand (X) in accordance with the first control signal, and a second multiplicand expanding circuit which expands the multiplicand in its bit number by adding the multiplicand and the bit row composed of "0" or including a value of a most significant bit of the multiplicand in accordance with the second control signal.

In the structure of the above, the second multiplicand replacing circuits may replace, with "0", a value of a predetermined bit (Y3) of the multiplier (Y), when the second control signal (FUGOU) indicates to handle the multiplier and the multiplicand as including a sign;

the third multiplicand replacing circuit may replace each of the most significant half the bits of the multiplicand with a value of a most significant bits included in the least significant half the bits, when the first control signal indicates a multiplication operation with low accuracy and the second control signal indicates to handle the multiplier and the multiplicand as including a sign, and may replace each of the most significant half the bits of the multiplicand with the bit row composed of "0", when the first control signal indicates a multiplication operation with low accuracy and the second control signal indicates to handle the multiplier and the multiplicand as not including any sign;

the fourth multiplicand replacing circuit may replace, with "0", each value of the least significant half the bits of the multiplicand (X), when the first control signal indicates a multiplication operation with low accuracy; and each of the first and second multiplicand expanding circuits may expand the multiplicand in its bit number by adding the multiplicand and the bit row including a value of the most significant bit of the multiplicand, when the second control signal indicates to handle the multiplier and the multiplicand as including a sign, and may expand the multiplicand in its bit number by adding the multiplicand and the bit row composed of "0", when the second control signal indicates to handle the multiplier and the multiplicand as not including any sign.

In order to achieve the above-described objects, according to the third aspect of the present invention, there is provided a multiplication method for carrying out a multiplication operation using a Booth's algorithm, comprising:

dividing a multiplier (Y) into a plurality of partial bit rows;

replacing, with "0", a value of a most significant bit (Y3) included in least significant half of bits of the multiplier (Y) in accordance with a first control signal (SIMD), so as to replace a predetermined bit included in the plurality of partial bit rows;

parallelly generating partial products, represented in bits which are twice as many as a bit number of the multiplicand (X), of a multiplicand (X) and each corresponding one of the partial bit rows;

adding the bit rows of the least significant half the bits of the generated partial products;

selecting, as one or more carry signals, either a carry signal generated by an addition result of the bit rows of the least significant half the bits of the partial products or a bit row composed of "0", in accordance with the first control signal (SIMD); and adding the bit rows of most significant half the bits of each partial product, in consideration of a carry signal;

wherein the generating the partial products can be performed by generating either partial product of full bits of the multiplicand (X) and each corresponding partial bit row or of the least significant half the bits of the multiplicand (X) and each corresponding bit row, in accordance with a first select signal (SIMD), in a case of generating a partial product of the multiplicand (X) and each partial bit row of the least significant half the bits, and generating either partial product of full bits of the multiplicand (X) and each corresponding partial bit row or of the most significant half the bits of the multiplicand (X) and each corresponding bit row, in accordance with the first select signal (SIMD), in a case of generating a partial product of the multiplicand (X) and each corresponding partial bit row of the most significant half the bits.

In order to achieve the above-described objects, according to the fourth aspect of the present invention, there is provided a multiplication method for calculating a product of values represented by full bits of a multiplier and a multiplicand both capable of being divided into an identical number of blocks with each other, or a product of values each represented by a corresponding bit block, the method comprising:

dividing a multiplier into a plurality of partial bit rows;

replacing, with "0", a value of a most significant bit included in each block of the multiplier in accordance with a first control signal, so as to replace a predetermined bit included in the plurality of partial bit rows with "0";

parallelly generating a partial product, represented in bits which are twice as many as a bit number of a multiplicand, of the multiplicand (X) and each corresponding one of the partial bit rows;

dividing each of the generated partial products into number of predetermined blocks which is identical with number of the blocks of the multiplier and the multiplicand, and adding bits which belong to an identical block; and selecting, in a case of adding the partial products represented in each block, either a carry signal or "0", and inputting the selected data as a carry signal, wherein the generating the partial products is performed by generating either partial product of full bits of the multiplicand and each corresponding bit row or of any block of the multiplicand and each corresponding bit row, in accordance with the first control signal.

By employing the multiplication method according to the fourth aspect of the present invention, two or more (arbitrary number of) arithmetic operations for obtaining a sum of products can parallelly be performed.

In order to achieve the above-described objects, according to the fifth aspect of the present invention, there is provided a method for calculating a sum of products and for adding a multiplication result executed by using a Booth's algorithm, comprising:

dividing a multiplier (Y) into a plurality of partial bit rows;

replacing, with "0", a value of a most significant bit (Y3) included in the partial bit row of least significant half of bits of a multiplier (Y) in accordance with a first control signal (SIMD), so as to replace a predetermined bit included in the plurality of partial bit rows;

parallelly generating partial products, represented in bits which are twice as many as a bit number of a multiplicand, of the multiplicand (X) and each corresponding one of the partial bit rows;

adding bit rows of the least significant half the bits of the generated partial products, together with so-farobtained sums of products corresponding to the least significant half the bits;

selecting, as one or more carry signals, either a bit row composed of "0" or a carry signal which is generated by an addition result of the so-far-obtained sum of products corresponding to the bit row of the least significant half the bits of the partial products and corresponding to the least significant half the bits, in accordance with the first control signal (SIMD);

adding the bit row of most significant half the bits of the generated partial products, together with the so-far-obtained sum of the products corresponding to the most significant half the bits, in consideration of a carry signal; and retaining a newly-calculated sum of the products, as the addition result of adding the least significant half and the most significant half the bits, wherein the generating the partial products can be performed by generating either partial product of full bits of the multiplicand (X) and each corresponding one of the partial bit rows or of the least significant half the bits of the multiplicand (X) and each corresponding one of the partial bit rows in accordance with a first select signal, in a case of generating a partial product of the multiplier (X) and the partial bit row of the least significant half the bits, and generating either partial product of full bits of the multiplicand (X) and each corresponding one of the partial bit rows or of the most significant half the bits of the multiplicand (X) and each corresponding one of the bit rows in accordance with the first select signal, in a case of generating a partial product of the multiplier (X) and the partial bit row of the most significant half the bits.

In order to achieve the above-described objects, according to the sixth aspect of the present invention, there is provided a method for sequentially adding a product of values represented by full bits of a multiplier and a multiplicand both capable of being divided into an identical number of blocks with each other, or a product of values each represented by a corresponding bit block, the method comprising:

dividing the multiplier into a plurality of partial bit rows;

replacing, with "0", a value of a most significant bit of each block of the multiplier in accordance with a first control signal, so as to replace a predetermined bit included in the plurality of partial bit rows;

parallelly generating partial products, each represented in bits which are twice as many as a bit number of the multiplicand (X), of the multiplicand (X) and each corresponding one of the partial bit rows;

dividing each of the generated partial products, into number of predetermined blocks which is identical with number of the blocks of the multiplier and the multiplicand, and adding the block of each of the partial product and a so-far-calculated sum of the products of the blocks, together with bits which belong to an identical block;

selecting either a carry signal or "0" in accordance with the first control signal, and inputting the selected data as one or more carry signals, in a case of adding the partial products of the blocks; and retaining a newly-calculated sum of products, as an addition result of the blocks, wherein the generating the partial products can be performed by generating either partial product of full bits of the multiplicand and each corresponding one of the partial bit rows or of any block of the multiplicand and a corresponding one of the bit rows, in accordance with the first control signal.

By employing the method for calculating the sum of products according to the sixth aspect of the present invention, two or more (arbitrary number of) calculations for obtaining a sum of products can parallelly be executed with low accuracy.

BRIEF DESCRIPTION OF THE DRAWINGS

These objects and other objects and advantages of the present invention will become more apparent upon reading of the following detailed description and the accompanying drawings in which:

FIGS. 4A and 4B are diagrams for explaining operations of the multiplier shown in FIG. 1;

FIG. 5 is a block diagram showing a structure of a multiplier according to the second embodiment of the present invention;

FIGS. 6A and 6B are diagrams for explaining operations of the multiplier shown in FIG. 5;

DETAILED DESCRIPTION OF THE PREFERRED EMBODIMENTS

Preferred embodiments of the present invention will now be described with reference to the accompanying drawings.

First Embodiment

Figure 1:
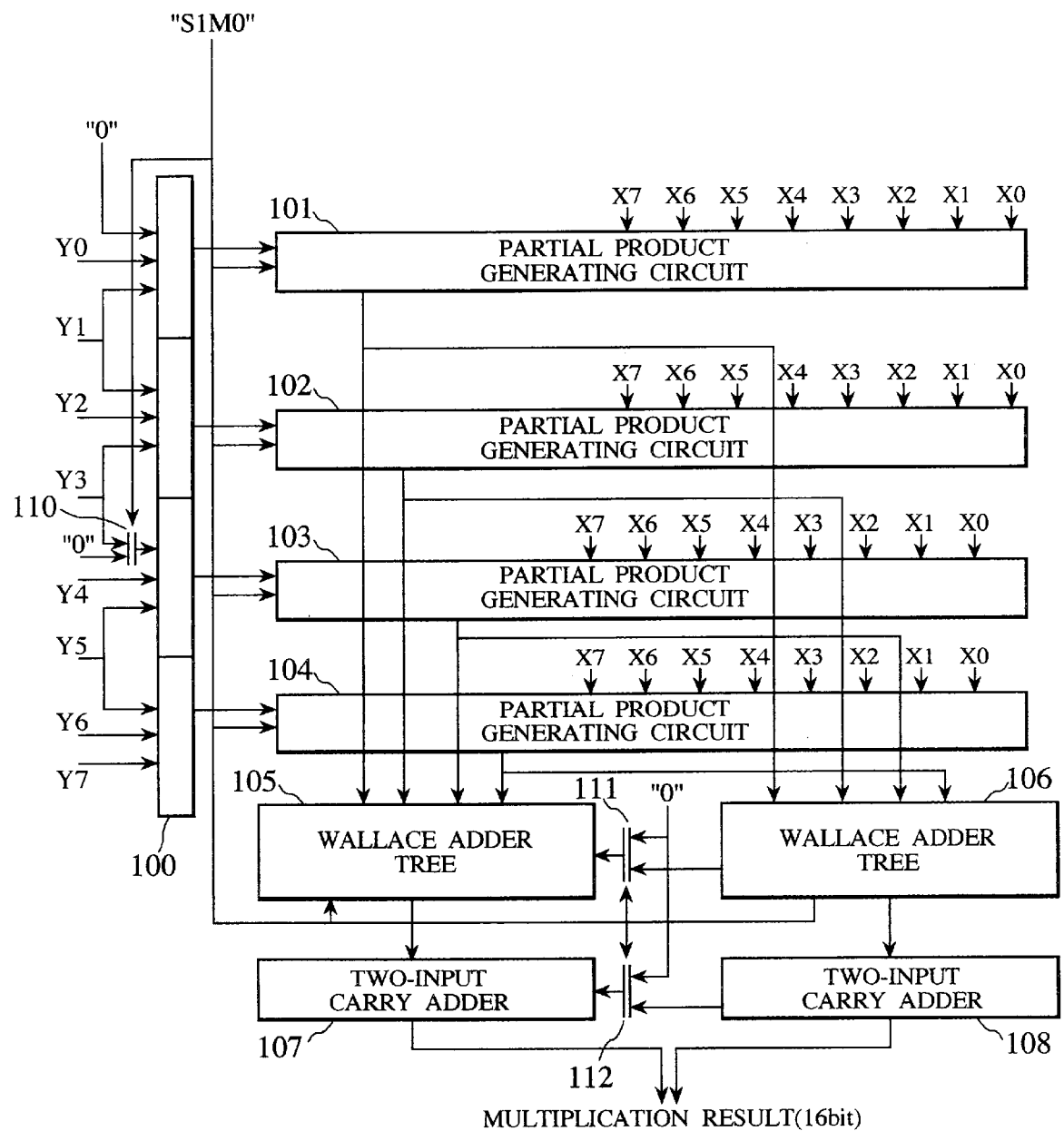
FIG. 1 is a block diagram showing a structure of a multiplier according to the first embodiment of the present invention.

FIG. 1 is a block diagram showing a structure of a multiplier according to the first embodiment. The multiplier shown in FIG. 1 calculates multiplication, with a high degree of accuracy, of a multiplier and a multiplicand each represented as eight bit data. The multiplier performs two multiplication operations, with a low degree of accuracy, based on a multiplier and a multiplicand each represented as four bit data. Such multiplier handles data which is expressed in a two's complement and has either sign of plus or minus. In other words, the multiplier of this embodiment is to execute the multiplication operation, with including either sign of plus or minus, with "eight bit accuracy", i.e., with the great accuracy, and two multiplication operations with "four bit accuracy", i.e., with the low accuracy.

The multiplier shown in FIG. 1 comprises a Booth decoder 100, partial product generating circuits 101 to 104, Wallace adder trees 105 and 106, two-input carry adders 107 and 108, and selectors 110 to 112.

In a case of performing the multiplication operation with the "eight bit accuracy", the Booth decoder 100 divides a multiplier Y (Y7 . . . Y0) into partial bit rows of (0, Y0, Y1), (Y1, Y2, Y3), (Y3, Y4, Y5), and (Y5, Y6, Y7) in accordance with an output from the selector 110, and supplies the divided bit rows to each corresponding one of the partial product generating circuits 101 to 104.

In a case of performing two multiplication operations with the "four bit accuracy", the Booth decoder 100 divides a multiplier Y (Y7 . . . Y0) into partial bit rows of (0, Y0, Y1), (Y1, Y2, Y3), (0, Y4, Y5), and (Y5, Y6, Y7) in accordance with an output from the selector 110, and supplies the divided partial bit rows to each corresponding one of the partial product generating circuits 101 to 104.

Each of the partial product generating circuits 101 to 104 obtains, as sixteen bit data, a partial product of a multiplicand X and each corresponding partial bit row of the multiplier Y sent from the Booth decoder 100. Each of the partial product generating circuits 101 to 104 supplies the eight most significant bits included in each of the obtained partial products to the Wallace adder tree 105, and the eight least significant bits included therein to the Wallace adder tree 106. The partial product generating circuits 101 to 104 will specifically be described later on.

The Wallace adder tree 106 adds all sets of the eight least significant bits included in the partial products which are obtained by the partial product generating circuits 101 to 104, and obtains sum signals and carry signals with respect to each digit. The Wallace adder tree 106 sends the obtained sum signals and the carry signals to the two-input carry adder 108. Further, the Wallace adder tree 106 sends the carry signals of the most significant two bits, which are obtained as an intermediate result, to the selector 111.

The Wallace adder tree 105 adds all sets of the eight most significant bits included in the partial products which are obtained by the partial product generating circuits 101 to 104, and obtains sums and carry signals with respect to each digit. The Wallace adder tree 105 sends the obtained sums and the carry signals to the two-input carry adder 107. The Wallace adder tree 105 obtains sums and carry signals, in consideration of a carry signal sent from the selector 111. The Wallace adder trees 105 and 106 will specifically be described later on.

Each of the two-input carry adders 107 and 108 adds the sums and the carry signals of the digits which are obtained by the Wallace adder trees 105 and 106, respectively. The carry signal from the selector 112 is input into the two-input carry adder 107. The two-input carry adders 107 and 108 will specifically be described later on.

The selector 110 selects either a Y3 bit of the multiplier Y or "0" in accordance with a control signal SIMD, and supplies the selected value to the Booth decoder 100. That is, the selector 100 controls an output signal in order to output a partial bit row (Y3, Y4, Y5) from the Booth decoder 100 to the partial product generating circuit 102 when the control signal SIMD indicates a multiplication operation with the "eight bit accuracy", and in order to output a partial bit row (0, Y4, Y5) from the Booth decoder 100 to the partial product generating circuit 102 when the control signal SIMD indicates a multiplication operation with the "four bit accuracy".

The selector 111 selects either "00" or carry signals from the two most significant bits output from the Wallace adder tree 106, in accordance with the control signal SIMD, and supplies the selected value as a carry signal to the Wallace adder tree 105. The selector 111 will specifically be described later. The selector 112 selects either "0" or a carry signal from the most significant bit which the two-input carry adder 108 outputs, in accordance with the control signal SIMD, and supplies the selected value as a carry signal to the two-input carry adder 107.

Figure 2:
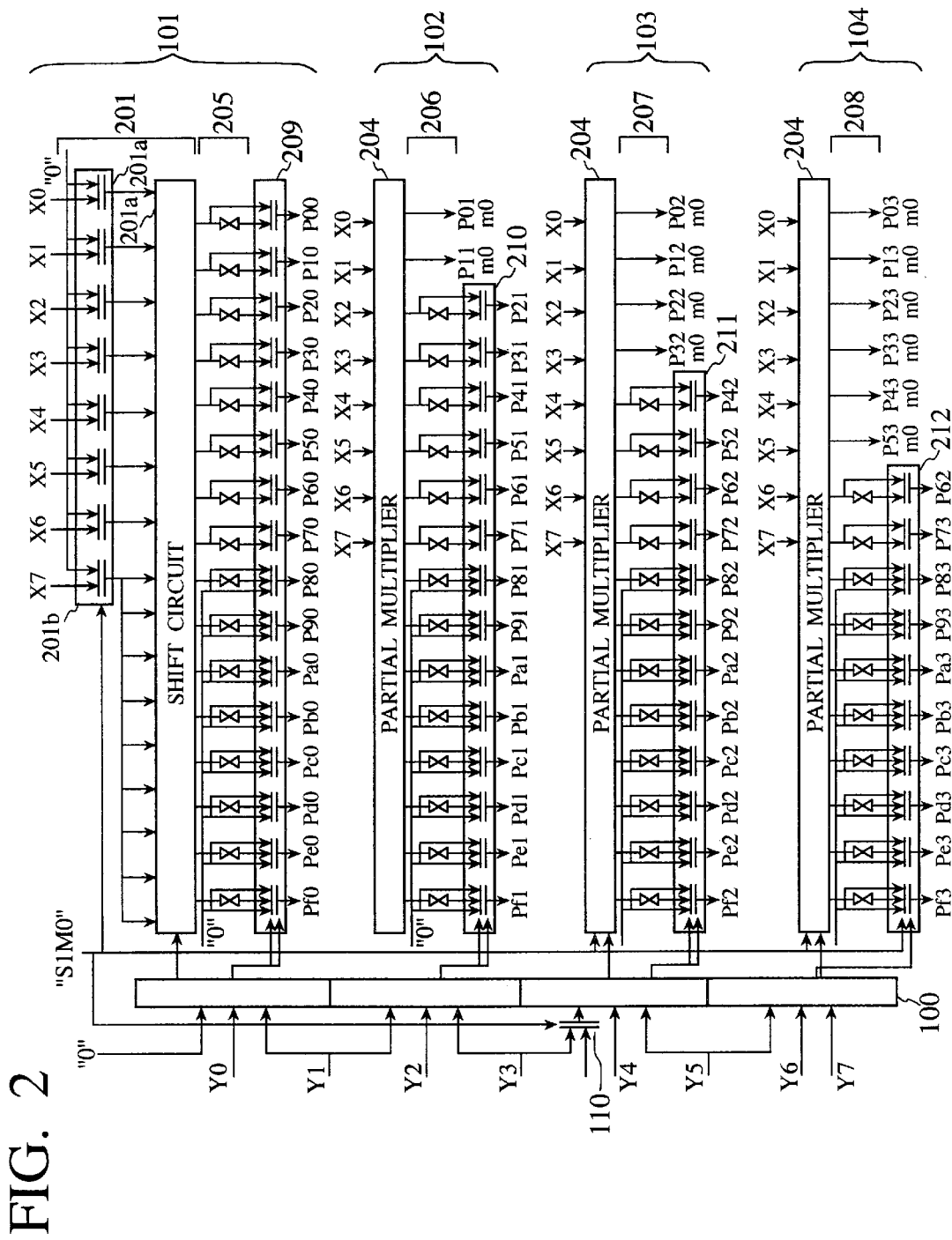
FIG. 2 is a diagram specifically showing a partial multiplier embodied in the multiplier shown in FIG. 1.

FIG. 2 is a diagram specifically showing the partial product generating circuits 101 to 104. As illustrated in FIG. 2, each of the partial product generating circuits 101 to 104 includes each corresponding one of partial multipliers 201 to 204, each corresponding one of inverter groups 205 to 208, and each corresponding one of selector groups 209 to 212.

The partial multiplier 201 includes selector groups 201*a*, 201*b*, and a shift circuit 201*c*. The selector group 201*a* selects and outputs either a partial bit row (X3 . . . X0) of a multiplicand or "0000", in accordance with a control signal SIMD. The selector group 201*b* selects and outputs either a partial bit row (X7 . . . X4) of a multiplicand X or (X3, X3, X3, X3) in accordance with a control signal SIMD.

The shift circuit 201*c* inputs data which represents the output from the selector group 201*a*, as the 0-th to the third least significant bits, the output from the selector group 201*b* as the fourth to the seventh least significant bits, and the output of the most significant bit from the selector group 201*b* as the eighth most significant bits. The shift circuit 201*c* shifts the input data to the MSB side (i.e., on the left end of FIG. 2), in accordance with a value of the partial bit row supplied from the Booth decoder 100. Hereafter, a data shift to the MSB side is referred to as a left shift.

Each of the partial multipliers 202 to 204 has a structure which is almost identical with that of the partial multiplier 201. It should be noted that each shift circuit (corresponding to the shift circuit 201*c*), which is included in each of the partial multipliers 202 to 204, performs a left shift of the input data in accordance with a corresponding partial bit row of the multiplier. Each piece of the left-shifted data is further left-shifted by two, four, and six bits, respectively. Hereafter, such a left shift of data is referred to as a re-shift operation. Each of the shift circuits inserts, after the re-shift operation is processed to the data, a value "0" of two, four, and six bits.

Each of the inverter groups 205 to 208 inverts the output data (except the output data which is inserted by the re-shift operation) output from the partial multipliers 201 to 204, and supplies the inverted data to a corresponding one of selector groups 209 to 210.

The selector group 209, in terms of the eight least significant bits, selects and outputs either output data of the partial multiplier 201 or of the inverter group 205, in accordance with a plus or minus sign of the output data of the partial multiplier 201. The selector group 209, in terms of the eight most significant bits, selects and outputs the either output data of the partial multiplier 201, the output data of the inverter group 205, or "00000000", in accordance with a control signal SIMD.

The selector group 210, in terms of the eight least significant bits, selects either the fourteen most significant bits of the output data of the partial multiplier 202 or the output data of the inverter group 206, and outputs the selected data, in accordance with a plus or minus sign, of the output data of the partial multiplier 202. The selector group 210, in terms of the eight most significant bits, selects and outputs either the output data of the partial multiplier 202, output data of the inverter group 206, or "00000000", in accordance with a control signal SIMD.

The selector group 211 selects and outputs either the twelve most significant bits of the output data of the partial multiplier 203 or output data of the inverter group 207, in accordance with a control signal SIMD and with whether the output data (the eight most significant bits with the "four bit accuracy") of the partial multiplier 203 indicates a plus or minus sign.

The selector group 212 selects and outputs either the ten most significant bits of the output data of the partial multiplier 203 or the output data of the inverter group 207, in accordance with whether output data (the eight most significant bits with the "four bit accuracy") of the partial multiplier 204 indicates a plus or minus sign and with a control signal SIMD.

Each of the partial product generating circuits 101 to 104 outputs a partial product, with including a plus or minus sign, of a multiplicand X and the partial bit row of the multiplier Y which are output from the Booth decoder 100, as long as the partial multipliers 201 to 204, the inverter groups 205 to 208, and the selector groups 209 to 212n executes the above-described processes. Hereinafter, each of the partial products output from the partial product generating circuits 101 to 104 will respectively be referred to as (Pf0 . . . P00), (Pf1 . . . P01), (Pf2 . . . P02), and (Pf3 . . . P03). Each value of P01, P11, P02, P12, P22, P32, P03, P13, P23, P33, P43, P53 is always "0".

Figure 3A:
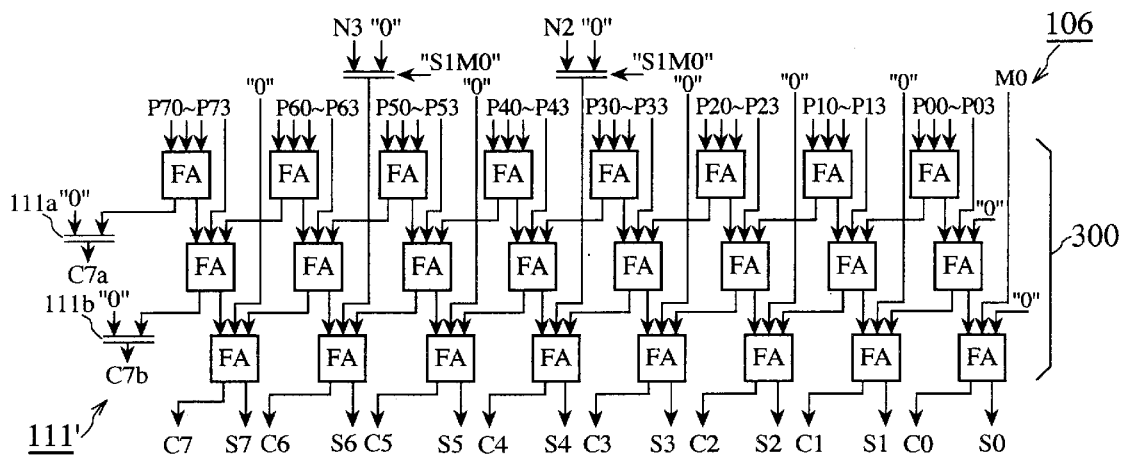
FIGS. 3A and 3B are diagrams each specifically showing a Wallace adder tree included in the multiplier shown in FIG. 1.

FIG. 3A is a diagram specifically showing the Wallace adder tree 106. As shown in FIG. 3A, the Wallace adder tree 106 includes selectors 106a, 106b, and a full adder group 300 comprising twenty four full adders.

The selector 106a selects and outputs either N3 or "0", in accordance with a control signal SIMD. The selector 106b selects and outputs either N2 or "0" in accordance with a control signal SIMD. The full adder group 300 inputs N0, N1, and the eight least significant bits of the output data of the respective partial product generations circuits 101 to 104, and output data of the respective selectors 106 and 106b. The full adder group 300 adds the all partial products which are output from the partial product generating circuits 101 to 104, to obtain sums (S0 . . . S7) and carry signal (C0 . . . C7). Each of N1 to N4 is one bit data whose value is "0" when a partial product output from each corresponding one of the partial product generating circuits 101 to 104 includes a plus sign, and whose value is "1" when a partial product output therefrom includes a minus sign.

As illustrated in FIG. 3A, the above-described selector 111 actually includes two selectors 111a and 111b. The selector 111a selects either "0" or a carry signal of a full adder, as one of the full adder group 300, indicated in the left upper level in the Wallace adder tree shown in FIG. 3A, and sends the selected data as a carry signal C7a to the Wallace adder tree 105. The selector 111b selects either "0" or a carry signal of a full adder, as one included in the full adder group 300, indicated in the left middle level in the Wallace adder tree shown in FIG. 3A, and sends the selected data as a carry signal C7b to the Wallace adder tree 105.

Figure 3B:
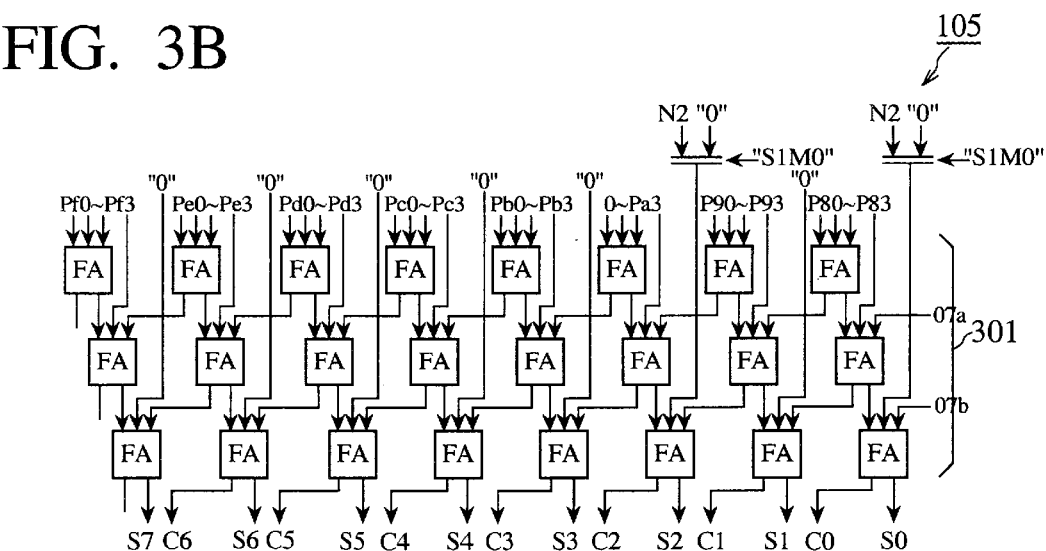

FIG. 3B is a diagram specifically showing the Wallace adder tree 105. As illustrated in FIG. 3B, the Wallace adder tree 105 includes selectors 105a, 105b, and a full adder group 301 comprising twenty four full adders.

The selector 105a selects and outputs either N3 or "0" in accordance with a control signal SIMD. The selector 105b selects and outputs either N2 or "0" in accordance with a control signal SIMD. The full adder group 301 inputs output data of selectors 106a, 106b, and of the eight most significant bits of the respective data of the partial product generating circuits 101 to 104, and the carry signals C7a and C7b respectively output from the selectors 111a and 111b. The full adder group 301 adds the partial products which are output from the partial product generating circuits 101 to 104, and obtains sums (S8 . . . Sf) and carry signals (C8 . . . Cf).

Figure 3C:
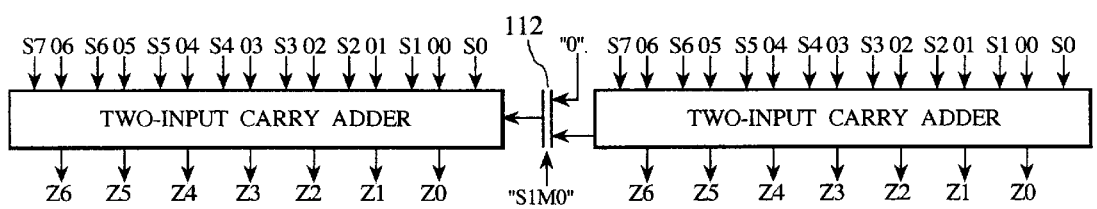
FIG. 3C is a diagram specifically showing a two-input carry adder included in the multiplier shown in FIG. 1.

FIG. 3C is a diagram specifically showing the two-input carry adders 107 and 108. As illustrated in FIG. 3C, the two-input carry adder 108 adds the output signals (S0 . . . S7) and the carry signals (C0 . . . C6) in the Wallace adder tree 106 so as to output multiplication results (Z0 . . . Z7). The two-input carry adder 108 adds the output signals (S8 . . . Sf) and the carry signals (C8 . . . Ce) in the Wallace adder tree 105, in consideration of the carry signal output from the selector 112, so as to output multiplication results (Z8 . . . Zf).

Operations of the multiplier according to this embodiment will now be described. In this embodiment, there are considered two cases, (1) where a multiplication operation with the "eight bit accuracy" is performed, and (2) where a multiplication operation with the "four bit accuracy" is performed. Hereinafter, the operations of the multiplier according to this embodiment will be explained, by separately referring to each of the above-described cases.

(1) In a case of performing a multiplication operation with "eight bit accuracy"

In this case, the selector 110 outputs a Y3 bit of a multiplier Y in accordance with a control signal SIMD. The Booth decoder 100 divides a multiplier Y into partial bit rows of (0, Y0, Y1), (Y1, Y2, Y3), (Y3, Y4, Y5), (Y5, Y6, Y7), and supplies the bit rows to each corresponding one of the partial product generating circuits 101 to 104.

In each of the partial multipliers 201 to 204 contained in each of the partial product generating circuits 101 to 104, the selector 201a (including those included in each of the partial multipliers 202 to 204) selects and outputs the 0-th to the third least significant bits (X3 . . . X0) of a multiplicand X, whereas the selector 201b (including those included in each of the partial multipliers 202 to 204) selects and outputs the fourth to seventh least significant bits of the multiplicand (X4 . . . X7). The output data output from the selectors 201a and 201b are the input data of the eight least significant bits of the shift circuit 201c (including those included in each of the partial multiplier 202 to 204. The same applies to the next paragraph). The input data of the eight most significant bits of the shift circuit 201c is indicated as (X7, X7, X7, X7, X7, X7, X7, X7).

The shift circuit 201a performs the left shift of the input data in accordance with the partial bit row which is supplied from the Booth decoder 100. The shift circuits 201c corresponding to each of the partial multipliers 202 to 204 performs the re-shift operation of the left-shifted data further by two, four, and six bits. The shift circuit 201c outputs the left-shifted (and re-shifted) data as a multiplication result of the multiplicand X and the partial bit row of the multiplier Y which is processed by the partial multipliers 201 to 204.

Each of the inverter groups 205 to 208 inverts and outputs corresponding output data of the partial multipliers 201 to 204. Each of the selector groups 209 to 212 selects either corresponding output data of the partial multipliers 201 to 204 or the output data of the inverter groups 205 to 208, and outputs the selected data according to the following processes.

The selector group 209 selects the entire output data of the partial multiplier 201 and outputs the selected data as output data (Pf0 . . . P00) of the partial product generating circuit 101, if the multiplication result output from the partial multiplier 201 indicates a plus sign. On the contrary, the selector group 209 selects the entire output data of the inverter group 205 and outputs the selected data as output data (Pf0 ... P00) of the partial product generating circuit 101, if the multiplication result output from the partial multiplier 201 indicates a minus sign.

The selector 210 selects the entire fourteen most significant bits of the output data of the partial multiplier 202 and outputs the selected bits as the fourteen most significant bits (Pf1 ... P21) of the output data of the partial product generating circuit 102, if the multiplication result output from the partial multiplier 202 indicates a plus sign. On the contrary, the selector 210 selects the entire output data of the inverter group 206 and outputs the selected data as the fourteen most significant bits (Pf1 ... P21) of the output data of the partial product generating circuit 102, if the multiplication result output from the partial multiplier 202 indicates a minus sign. The two least significant bits (P11, P01) of the output data of the partial product generating circuit 102 are both "0", regardless of which sign the multiplication result indicates.

The selector group 211 selects all of the twelve most significant bits of the output data of the partial multiplier 203 and outputs the selected bits as the twelve most significant bits (Pf2 ... P42) of the output data of the partial product generating circuit 103, if the multiplication result output from the partial multiplier 203 indicates a plus sign. On the contrary, the selector group 211 selects the entire output data of the inverter group 207 and outputs the selected data as the twelve most significant bits (Pf2 ... P42) of the output data of the partial product generating circuit 103, if the multiplication result output from the partial multiplier 203 indicates a minus sign. The four least significant bits (P32, P02) of the output data of the partial product generating circuit 103 are all "0", regardless of which sign the multiplication result indicates.

The selector group 212 selects all of the ten most significant bits of the output data of the partial multiplier 204 and outputs the selected bits as the ten most significant bits (Pf3 ... P63) of the output data of the partial product generating circuit 104, if the multiplication result output from the partial multiplier 204 indicates a plus sign. On the contrary, the selector group 212 selects the entire output data of the inverter group 208 and outputs the selected data as the ten most significant bits (Pf3 ... P63) of the output data of the partial product generating circuit 104, if the multiplication result output from the partial multiplier 204 indicates a minus sign. The six least significant bits (P53, P03) of the output data of the partial product generating circuit 104 are "0", regardless of which sign the multiplication result indicates.

Each of the partial product generating circuits 101 to 104 sends the eight least significant bits of its output data (partial product) to the Wallace adder tree 106, and sends the eight most significant bits of its output data to the Wallace adder tree 105. The selectors 105a and 106a included respectively in the Wallace adder trees 105 and 106 select and output N3, whereas the selectors 105b and 106b included respectively therein select and output N2.

The Wallace adder tree 106 adds, by employing a carry save method, all sets of the eight least significant bits of the partial products which are generated by the respective partial product generating circuits 101 to 104. The Wallace adder tree 106 then generates sum signals (S7 ... S0) and carry signals (C6 ... C0). The Wallace adder tree 106 then sends the generated sum signals (S7 ... S0) and the generated carry signals (C6 ... C0) to the two-input carry adder 108. Each of the selectors 111a and 111b selects the carry signals (C7a, C7b) of the intermediate result data which the Wallace adder tree 106 generates, and sends the selected signals as carry signals to the Wallace adder tree 105.

The Wallace adder tree 105 adds, by employing a carry save method, all sets of the eight most significant bits of the partial products generated by the respective partial product generating circuits 101 to 104, in consideration of the carry signals (C7a, C7b) output from the Wallace adder tree 106. The Wallace adder tree 105 generates sum signals (Sf ... S8) and carry signals (Cf ... C8). The Wallace adder tree 105 supplies, to the two-input carry adder 107, the generated sum signals (Sf ... S8) and the carry signals (Ce ... C8).

The two-input carry adder 108 adds the sum signals (S7 ... S0) and the carry signals (C6 ... C0) which are sent from the Wallace adder tree 106, and obtains multiplication results (Z7 ... Z0) of the eight least significant bits. The selector 112 selects the carry signal, which is generated during the addition in the two-input carry adder 108, and supplies the selected signal to the two-input carry adder 107. The two-input carry adder 107 adds the sum signals (Sf ... S8) and the carry signals (Ce ... C8) which are supplied from the Wallace adder tree 105, in consideration of the carry signal from the two-input carry adder 108, and obtains multiplication results (Zf ... ZB) of the eight most significant bits.

(2) In a case of performing two multiplication operations with "four bit accuracy"

It is assumed that partial bit rows (X7 ... X4), (X3 ... X0) of a multiplicand, and partial bit rows (Y7 ... Y4), (Y3 ... Y0) of a multiplier are independent data. The multiplier of the present invention simultaneously executes a multiplication operation of (X ... X4) and (Y7 ... Y4) and a multiplication operation of (X3 ... X0) and (Y3 ... Y0), by operating processes which will be described below.

The selector 110 outputs "0" in accordance with a control signal SIMD. Now, the Booth decoder 100 divides a multiplier Y into partial bit rows of (0, Y0, Y1), (Y1, Y2, Y3), (0, Y4, Y5), and (Y5, Y6, Y7), and sends the bit rows in one-to-one correspondence with each of the partial product generating circuits 101 to 104.

In the multipliers 201 and 202 included in the partial product generating circuits 101, 102, the selector 201a (including those corresponding to the partial multiplier 202) selects and outputs the 0-th to third least significant bits (X3 ... X0) of the multiplicand X, whereas the selector 201b (including those corresponding to the partial multiplier 202) selects and outputs an X3 bit of the multiplicand. The output data of the selectors 201a and 201b are input data of the eight least significant bits of the shift circuit 201c (including those corresponding to the partial multiplier 201. The same applies to the next paragraph). The input data of the eight most significant bits of the shift circuit 201c is indicated as (X3, X3, X3, X3, X3, X3, X3, X3).

The shift circuit 201c performs a left shift of the input data in accordance with the partial bit row which is supplied from the Booth decoder 100. The shift circuit 201c corresponding to the partial multiplier 202 performs the re-shift operation to the left-shifted data by two bits. The shift circuit 201c outputs the left-shifted data as a multiplication result of the partial bit row of the multiplier Y and the multiplicand X which is processed by the partial multipliers 201 and 202.

Each of the inverter groups 205 and 206 inverts and outputs corresponding output data of the partial multipliers 201 and 202.

The selector group 209 selects the value "0" of the eight most significant bits and outputs the selected data as the eight most significant bits (Pf0 ... P80) of the output data of the partial product generating circuit 101. The selector group 209 selects the eight least significant bits of the output data of the partial multiplier 201, and outputs the selected data as the eight least significant bits (P70 . . . P00) of the output data of the partial product generating circuit 101, if the multiplication result output from the partial multiplier 201 indicates a plus sign. On the contrary, the selector group 209 selects the eight least significant bits of the output data of the inverter group 205, and outputs the selected data as the eight least significant bits (P70 . . . P00) of the output data of the partial product generating circuit 101, if the multiplication result output from the partial multiplier 201 indicates a minus sign.

The selector group 210 selects the value "0" of the eight most significant bits and outputs the selected data as the eight most significant bits (Pf1 . . . P81) of the output data of the partial product generating circuit 102. The selector group 207 selects the second to seventh least significant bits of the output signal of the partial multiplier 202, and outputs the selected data as the second to seventh least significant bits (P71 . . . P21) of the output data of the partial product generating circuit 102, if the multiplication result output from the partial multiplier 202 indicates a plus sign. On the contrary, the selector group 207 selects the second to seventh least significant bits of the output signal of the inverter group 205, and outputs the selected data as the second to seventh least significant bits (P71 . . . P21) of the output data of the partial product generating circuit 102, if the multiplication result output from the partial multiplier 202 indicates a minus sign. The two least significant bits (P11, P01) of the output data of the partial product generating circuit 102 are both "0", regardless of which sign the multiplication result indicates.

Each selector 201a contained in each of the partial multipliers 203 and 204 of the corresponding partial product generating circuits 103 and 104 selects and outputs the value "0", whereas each selector 201b (indicating those corresponding to that of the partial multipliers 203 and 204) selects and outputs the fourth to seventh least significant bits (X4 . . . X7) of the multiplicand X. The output data of the selectors 201a and 201b are input data of the eight least significant bits of the shift circuit 201c (indicating those corresponding to that of the partial multipliers 203 and 204. The same applies to the next paragraph.). The input data of the eight most significant bits of the shift circuit 201c is indicated as (X7, X7, X7, X7, X7, X7, X7, X7).

Now, the shift circuit 201c performs a left shift of the input signals in accordance with the partial bit row supplied from the Booth decoder 100. Each of the shift circuits 201c of the partial multipliers 203 and 204 performs the re-shift operation to the left-shifted data by four and six bits. The shift circuit 201c outputs the data, which are left-shifted and re-shifted according to the above-described processes, as a multiplication result of the multiplicand X and the partial bit row of the multiplier Y, which is processed by the partial multipliers 203 and 204.

Each of the inverter groups 207 and 208 inverts and outputs corresponding output data of the partial multipliers 203 and 204. Each of the selector groups 211 and 212 selects either the corresponding output data of the partial multipliers 203 and 204 or the corresponding output data of the inverter groups 207 and 208, and outputs the selected output data, in a manner described below.

The selector group 211 selects the eight most significant bits of output data of the partial multiplier 203, and outputs the selected data as the eight most significant bits (Pf2 . . . P82) of the output data of the partial product generating circuit 103, if the multiplication result output from the partial multiplier 203 indicates a plus sign. On the contrary, the selector 211 selects output signals of the inverter group 207, and outputs the selected signals as the eight most significant bits (Pf2 . . . P82) of the output data of the partial product generating circuit 103, if the multiplication result output from the partial multiplier 203 indicates a minus sign. The selector group 211 selects the fourth to seventh least significant bits of the output data of the partial multiplier 203, and outputs the selected data as the fourth to seventh least significant bits (P72 . . . P42) of the output data of the partial product generating circuit 103. The four least bits (P32 . . . P30) of the output data of the partial product generating circuit 103 are all "0", regardless of which sign the multiplication result indicates.

The selector group 212 selects the eight most significant bits of output data of the partial multiplier 204, and outputs the selected data as the eight most significant bits (Pf3 . . . P83) of the output data of the partial product generating circuit 104, if the multiplication result output from the partial multiplier 204 indicates a plus sign. On the contrary, the selector group 212 selects output data of the inverter group 208, and output the selected data as the eight most significant bits (Pf3 . . . P83) of the output data of the partial product generating circuit 104, if the multiplication result output from the partial multiplier 204 indicates a minus sign. The selector group 212 selects the sixth and seventh least significant bits of output signals of the partial multiplier 203, and outputs the selected data as the sixth and seventh least significant bits (P73, P63) of the output data of the partial product generating circuit 104. The six least significant bits (P53 . . . P03) of the output data of the partial product generating circuit 104 are all "0", regardless of which sign the partial product indicates.

Each of the partial product generating circuits 101 to 104 supplies the eight least significant bits of their output data (partial product) to the Wallace adder tree 106, and supplies the eight most significant bits of their output data to the Wallace adder tree 105. At this time, each of the selectors 105a and 106b in each of the Wallace adder trees 105 and 106 selects and outputs "0", and each of the selectors 105b and 105b included therein selects and outputs "0".

The Wallace adder tree 106 adds all sets of the eight least significant bits of the partial products generated by the partial product generating circuits 101 to 104, by employing a carry save method, and generates sum signals (S7 . . . S0) and carry signals (C7 . . . C0). The Wallace adder tree 106 supplies the generated sum signals (S7 . . . S0) and carry signals (C6 . . . C0), to the two-input carry adder 108. Each of the selectors 111a and 111b selects "0" and supplies the selected data as a carry signal, to the Wallace adder tree 105.

The Wallace adder tree 105 adds all digits of the eight most significant bits of the partial product generated by the partial product generating circuits 101 to 104, by employing a carry save method, and generates sum signals (Sf . . . S8) and carry signals (Cf . . . C8). The Wallace adder tree 105 supplies the generated sum signals (Sf . . . S8) and the carry signals (Ce . . . C8) to the two-input carry adder 107.

The two-input carry adder 108 adds the sum signals (S7 . . . S0) and the carry signals (C6 . . . C0) which are supplied from the Wallace adder tree 106, and obtains multiplication results (Z7 . . . Z0) of the eight least significant bits. The selector 112 does not select the carry signals supplied from the two-input carry adder 108, but selects "0" and supplies the selected data to the two-input carry adder 107. The two-input carry adder 107 adds the sum signals (Sf . . . S8) and the carry signals (Ce . . . C8) which are supplied from the Wallace adder tree 105, and obtains multiplication results (Zf . . . Z8) of the eight most significant bits.

The multiplication results (Zf . . . Z8) of the eight most significant bits which are obtained from the two-input carry adder 107 are multiplication results of (X7 . . . X4) and (Y7 . . . Y4). The multiplication results (Z7 . . . Z0) of the eight least significant bits which are obtained from the two-input carry adder 108 are multiplication results of (X3 . . . X0) and (Y3 . . . Y0).

Operations of the multiplier according to this embodiment will now be specifically described with reference to FIGS. 4A and 4B. Now, a case where a multiplier Y is represented as "00111110" and a multiplicand X is represented as "11001101" will be explained by way of an example.

FIG. 4A illustrates a case where a multiplication operation with including a sign is processed with the "eight bit accuracy". In this case, both of the multiplier Y and the multiplicand X are assumed to be eight bit data, thus a general Booth's algorithm is employed therein. In this example, the Booth decoder 100 divides the multiplier Y into partial bit rows of "001", "111", "111", and "100". FIG. 4A demonstrates the multiplication operation, wherein the partial product generating circuits 101 to 104 generate values, each represented as a partial product of the respective partial bit rows and the multiplicand X.

The Wallace adder tree 105 and the two-input carry adder 107 add sets of the eight most significant bits in the partial products, with one another, generated by the partial product generating circuits 101 to 104, whereas the Wallace adder tree 106 and the two-input carry adder 108 add sets of the eight least significant bits, with one another. In such a case, the selector 111 selects the carry signals of the Wallace adder tree 106, and sends the selected signals to the Wallace adder tree 105, whereas the selector 112 selects the carry signals of the two-input carry adder 108, and sends the selected signals to the two-input carry adder 107. Thus, the resultant addition "11001110100110", in which the partial products are added with each other by the two-input carry adders 107 and 108, is a multiplication result of the multiplier Y and the multiplicand X.

In other words, the resultant addition, i.e., $(11001110100110)_2=(-3162)_{10}$ indicates a product of the multiplier Y $(00111110)_2=(+62)_{10}$ and the multiplicand X $(11001101)_2=(-51)_{10}$. It should be noted in this case that $(\ )_2$ represents that the numbers in the parentheses are binary, and $(\ )_{10}$ represents that the numbers therein are decimal.

FIG. 4B illustrates a case where a multiplication operation with including a sign is processed with the "four bit accuracy", by way of an example. In this case, the four most significant bits and the four least significant bits of the multiplier Y, and the four most significant bits and the four least significant bits of the multiplicand X are all assumed as independent data. In this example, the Booth decoder 100 divides the multiplier X into partial bit rows of "001", "110", "111", and "100". Each of the partial multipliers 203 and 204 replaces the fourth least significant bit of the multiplicand X with "0", by means of the selector 201a (one corresponding to that included in both of the partial multipliers 203 and 204).

Each of the selector groups 209 and 210 selects the value "0" of the eight most significant bits of the partial products. The eight least significant bits of the partial products which are obtained by the partial multipliers 203 and 204 are all "0", since the four least significant bits of the multiplicand X are all replaced with "0". The shift circuit 201c (one corresponding to partial multipliers 203 and 204) performs a left-shift of the data. Accordingly, each of the partial product generating circuits 101 to 104 generates a value represented in FIG. 4B, as a partial product of each corresponding partial bit rows and the multiplicand X.

The Wallace adder tree 105 and the two-input carry adder 107 add all sets of the eight most significant bits of the respective partial products, with one another, generated by the partial product generating circuits 101 to 104, whereas the Wallace adder tree 106 and the two-input carry adder 108 add the sets of the eight least significant bits. In this case, the selector 111 selects the value "00" and supplies the selected data to the Wallace adder tree 105, whereas the selector 112 selects and supplies "0" to the two-input carry adder 107. Thus, the output signal of the two-input carry adder 107 indicate "111110100", whereas the output signal of the two-input carry adder 108 indicate "00000110".

Such multiplication results, $(11110100)_2=(-12)_{10}$ and $(00000110)_2=(+6)_{10}$, indicate a product of the four most significant bits $(0011)_2=(+3)_{10}$ of the multiplier Y and the four most significant bits $(1100)_2=(-4)_{10}$ of the multiplicand X, and a product of the four least significant bits $(1110)_2=(-2)_{10}$ of the multiplier Y and the four least significant bits $(1101)_2=(-3)_{10}$ of the multiplicand X, respectively.

As explained above, the multiplier according to this embodiment can execute a multiplication operation with the "eight bit accuracy" and two multiplication operations with the "four bit accuracy" employing identical hardware. In applying such a multiplier to a processor, an area of the processor may be reduced. This can attain providing a processor which can be advantageously low in power consumption and manufactured at low cost.

In addition to the above, in a case of performing any of a multiplication operation with the "eight bit accuracy" and two multiplication operations with the "four bit accuracy", the multiplier according to the present invention can obtain multiplication results at high speed, because it is not required to accumulate an intermediate result during such operation(s). The multiplier according to the present invention can execute two multiplication operations with the "four bit accuracy", resulting in a short operational time in a case of continuously performing multiplication operations with the "four bit accuracy". Accordingly, in applying the multiplier of this embodiment to the processor, such processor can achieve operations at high speed for not only software mainly for integer calculations, but software mainly for calculation with low accuracy.

Second Embodiment

FIG. 5 is a block diagram showing a structure of a multiplier according to the second embodiment. The multiplier shown in FIG. 5 handles data which is expressed in a two's complement and indicates a plus or minus sign, and data which is not expressed in any complement and indicates only a plus value without indicating any sign. The multiplier of this embodiment executes a multiplication operation, with the "eight bit accuracy", with including a sign or without including any sign, and two multiplication operations, with the "four bit accuracy", with including a sign or without including any sign. A with/without-sign signal indicates whether to handle a multiplier or a multiplicand as including a sign or not including any sign.

As illustrated in FIG. 5, the multiplier of this embodiment comprises a Booth decoder 501, selectors 502 to 504, partial product generating circuits 505 to 510, Wallace adder trees 511 and 512, two-input carry adders 107 and 108, and selectors 111 and 112. The two-input carry adders 107, 108, and the selectors 111 and 112 included in the multiplier of the embodiment are identical with those included in the multiplier of the first embodiment.

In a case of performing a multiplication operation with the "eight bit accuracy", without including any sign, the Booth decoder 501 divides a multiplier Y (Y7 . . . Y0) into partial bit rows of (0, Y0, Y1), (Y1, Y2, Y3), (0, 0, 0), (Y3, Y4, Y5), (Y5, Y6, Y7), and (Y7, 0, 0) in accordance with an output sent from the respective selectors 502 to 504, and sends the divided multiplier Y to each corresponding one of the partial product generating circuits 505 to 510.

In a case of performing a multiplication operation with the "eight bit accuracy", with including a sign, the Booth decoder 501 divides a multiplier Y (Y7 . . . Y0) into partial bit rows of (0, Y0, Y1), (Y1, Y2, Y3), (0, 0, 0), (Y3, Y4, Y5), (Y5, Y6, Y7), and (0, 0, 0) in accordance with an output sent from the selectors 502 to 504, and sends the divided multiplier to each corresponding one of the partial product generating circuits 505 to 510.

In a case of performing two multiplication operations with the "eight bit accuracy", without including any sign, the Booth decoder 501 divides a multiplier Y (Y7 . . . Y0) into partial bit rows of (0, Y0, Y1), (Y1, Y2, Y3), (Y3, 0, 0), (0, Y4, Y5), (Y5, Y6, Y7), and (Y7, 0, 0) in accordance with an output sent from the selectors 502 to 504, and sends the divided multiplier Y to each corresponding one of the partial product generating circuits 505 to 510.

In a case of performing two multiplication operations with the "four bit accuracy", with including a sign, the Booth decoder 501 divides a multiplier Y (Y7 . . . Y0) into partial bit rows of (0, Y0, Y1), (Y1, Y2, Y3), (0, 0, 0), (0, Y4, Y5), (Y5, Y6, Y7), and (0, 0, 0) in accordance with an output sent from the selectors 502 to 504, and sends the divided multiplier to each corresponding one of the partial product generating circuits 505 to 510.

Each of the partial product generating circuits 505 to 510 obtains, as sixteen bit data, a partial product of multiplicand X and the bit rows of the multiplier Y which are supplied from the Booth decoder 501. Each of the partial product generating circuits 505 to 510 sends all of the eight most significant bits included in the obtained data to the Wallace adder tree 511, and sends all of the eight least significant bits included in the obtained data to the Wallace adder tree 512.

Each of the partial product generating circuits 505 to 510 generates a partial product, with or without including a sign, of the multiplicand X and corresponding one of the partial bit rows of the multiplier Y, in accordance with the with/without-sign signal. Each of the partial product generating circuits 505 to 510 includes selectors 505a to 505c, a shift circuit 505d, and a selector 505e, for performing the multiplication operation with or without a sign (in FIG. 5, only the partial multiplier 505 is disclosed as one including the above-described selectors and such, however, the remaining multipliers may likewise have the same).

In a case of performing the multiplication operation with the "eight bit accuracy", without including any sign, the selector 505a selects (X3 . . . X0), and the selector 505b selects (X4 . . . X7), whereas the selector 505c selects the bit row composed of "0s" (the selectors 505a to 505c include any one corresponding to that included in the partial multipliers 505 to 510). On the contrary, in the case of performing the multiplication operation with the "eight bit accuracy", with including a sign, the selector 505a selects (X3 . . . X0), and the selector 505b selects (X4 . . . X7), whereas the selector 505c selects the bit row composed of X7 bit values.

In a case of performing the multiplication operation with the "four bit accuracy", without including any sign, the selector 505a corresponding to each of the partial multipliers 505 to 507 selects (X3 . . . X0), the selector 505b selects the bit row composed of "0s", whereas the selector 505c selects the bit row composed of "0s". The selector 505a corresponding to each one of the partial multipliers 508 to 510 selects the bit row composed of "0s", and the selector 505b selects (X7 . . . X4), whereas the selector 505c selects the bit row composed of "0s".

In a case of performing the multiplication operation with the "four bit accuracy", with including a sign, the selector 505a corresponding to each one of the partial multipliers 505 to 507 selects (X3 . . . X0), the selector 505b selects the bit row composed of X3 bit values, whereas the selector 505c selects the bit row composed of "0s". The selector 505a corresponding to each one of the partial multipliers 508 to 510 selects the bit row composed of "0s", and the selector 505b selects (X7 . . . X4), whereas the selector 505c selects the bit row composed of Y7 bit values.

Each shift circuit 505d performs a left-shift to the data which is supplied from the selectors 505a to 505c, in accordance with each corresponding one of the partial bit rows which the Booth decoder 100 has supplied. Afterwards, each shift circuit 505d corresponding to each one of the partial product generating circuits 506 to 510 performs a re-shift of the data by two, four, six, and eight bits, and inserts "0" therein.

In the case of performing the multiplication operation with the "eight bit accuracy", without including any sign, and the multiplication operation with the "eight bit accuracy", with including a sign, each selector 505e corresponding to each one of the partial product generating circuits 505 to 510 selects the eight most significant bits of the output data of each corresponding one of the shift circuit 505d, and outputs the selected bits. In the case of performing the multiplication operation with the "four bit accuracy", without including any sign, and the multiplication operation with the "four bit accuracy", with including a sign, each selector 505e corresponding each of the partial product generating circuits 505 to 507 selects the bit row composed of "0s" and outputs the selected bits. Each selector 505e of the partial product generating circuits 508 to 510 selects and outputs the eight most significant bits of the output data of the corresponding shift circuit 505d.

Each of the partial product generating circuits 505 to 510 obtains a partial product having sixteen bits in the above-described manner, sends the eight most significant bits of the product to the Wallace adder tree 511, and sends the eight least significant bits thereof to the Wallace adder tree 512.

The Wallace adder tree 512 adds sets of the eight least significant bits of the products obtained by the partial product generating circuits 505 to 510, and obtains sums and carry signals. The Wallace adder tree 512 supplies the obtained sums and the carry signals to the two-input carry adder 108. The Wallace adder tree 512 supplies the carry signals, obtained as intermediate results, of the two most significant bits to the selector 111.

The Wallace adder tree 511 adds all sets of the eight most significant bits of the partial products obtained by the respective partial product generating circuits 505 to 510, and obtains sums and carry signals. The Wallace adder tree 511 supplies the obtained sums and carry signals to the two-input carry adder 107. The Wallace adder tree 511 obtains such sums and carry signals, in consideration of carry signals , which are supplied from the selector 111.

Operations of the multiplier according to this embodiment are almost the same as those of the multiplier according to the first embodiment, but an operation wherein the selector selects the partial bit row in accordance with the with/without-sign signal, in this embodiment.

The operations of the multiplier according to this embodiment will now be specifically described with reference to FIGS. 6A and 6B. As described in the first embodiment, a case where a multiplier Y indicates "00111110" and a multiplicand X indicates "11001101" will be explained by way of an example likewise in this embodiment.

FIG. 6A illustrates a case where to perform a multiplication operation with the "eight bit accuracy", without including any sign. In this example, the Booth decoder 501 divides a multiplier Y into partial bit rows of "001", "111", "000", "111", "100", and "000". Each of the partial product generating circuits 505 to 510 generates a value represented in FIG. 6A, as a partial product of a multiplicand X and each corresponding one of the partial bit rows.

The Wallace adder tree 511 and the two-input carry adder 107 add sets of the eight most significant bits of the partial products generated by the respective partial product generating circuits 505 to 510, whereas the Wallace adder tree 512 and the two-input carry adder 108 add sets of the eight least significant bits. The selector 111 selects carry signals of the Wallace adder tree 512 and sends the selected signals to the Wallace adder tree 511, whereas the selector 112 selects a carry signal of the two-input carry adder 108 and supplies the selected carry signal to the two-input carry adder 107. Thus, the addition result, "0011000110100110", in which the partial products are added with one another as they are by the two-input carry adders 107 and 108, is the multiplication result of the multiplier Y and the multiplicand X.

The multiplication result, $(0011000110100110)_2=(12710)_{10}$, indicates a product of the multiplier Y $(00111110)_2=(62)_{10}$ and the multiplicand X $(11001101)_2=(51)_{10}$.

FIG. 6B illustrates an example where to perform a multiplication operation with the "four bit accuracy", without including any sign. In this case, the four most and four least significant bits of the multiplier Y, and the four most and four least significant bits of the multiplicand X are handled as independent data, without including any sign. In this example, the Booth decoder 501 divides the multiplier Y into partial bit rows of "001", "111", "100", "011", "100", "000". Each of the partial product generating circuits 508 to 510 replaces, with a value "0", the four least significant bits of the multiplicand X sent from the selector 505b.

Each selector 505e of the partial product generating circuits 505 to 507 selects "0" of the eight most significant bits of the partial product and outputs the data. The eight most significant bits of the partial products obtained by the partial product generating circuits 508 to 510 indicate "0", since the four least significant bits of the multiplicand X are all replaced with the value "0", and since the shift circuits have performed the shift of the data. Accordingly, each of the partial product generating circuits 505 to 510 generates a value represented in FIG. 6B as a partial product of each corresponding one of the above-described partial bit row and the multiplicand X.

The Wallace adder tree 511 and the two-input carry adder 107 add sets of the eight most significant bits of the partial products generated by the partial product generating circuits 101 to 104, whereas the Wallace adder tree 512 and the two-input carry adder 108 add sets of the eight least significant bits. At this time, the selector 111 selects "00" and sends the selected data to the Wallace adder tree 511, whereas the selector 112 selects "0" and sends the selected data to the two-input carry adder 107. The output signal of the two-input carry adder 107 indicates "00010100", and the output signal of the two-input carry adder 108 indicates "00000110".

Such multiplication results, $(00010100)_2=(36)_{10}$ and $(00000110)_2=(+6)_{10}$, indicate a product of the four most significant bits $(0011)2=(3)_{10}$ of the multiplier Y and the four most significant bits $(1100)2=(12)10$ of the multiplicand X, and a product of the four least significant bits $(1110)_2=(14)_{10}$ of the multiplier Y and the our least significant bits $(1101)_2=(13)_{10}$ of the multiplicand X, respectively.

As explained above, according to the multiplier of this embodiment, the multiplication operation with the "eight bit accuracy", and the two multiplication operations with the four bits accuracy can be executed with using identical hardware, in or not in consideration of its sign. In applying such a multiplier to a processor, an area of the processor may be reduced. This can attain providing a processor which can be advantageously low in power consumption and manufactured at low cost.

In addition to the above, according to the multiplier of this embodiment, because it is not required to accumulate intermediate results, multiplication results can be obtained at high speed in any of the multiplication operation with the "eight it accuracy" with including a sign, the multiplication operation with the "eight bit accuracy" without including any sign, the two multiplication operation s with the "four bit accuracy" with including a sign, and the two multiplication operations with the "four bit accuracy" without including any sign. Because the multiplier can execute two multiplication operations with the "four bit accuracy", regardless of which sign the data is indicated with. This results in a short operational time in performing the multiplication operation with the "four bit accuracy". Accordingly, in applying the multiplier of this embodiment to the processor, such processor can achieve operations at high speed for not only software mainly for integer calculations, but software mainly for calculation with low accuracy.

Third Embodiment

In the above-described first and second embodiments, such multipliers have been described by way of example, however, in this embodiment, an arithmetic unit for calculating a sum of products will now be described. The Wallace adder trees 105, 106, and the selector 111 which have been employed in the multiplier according to the first embodiment are modified in their structure, realizing the arithmetic unit for calculating a sum of products in this embodiment.

Figure 7A:
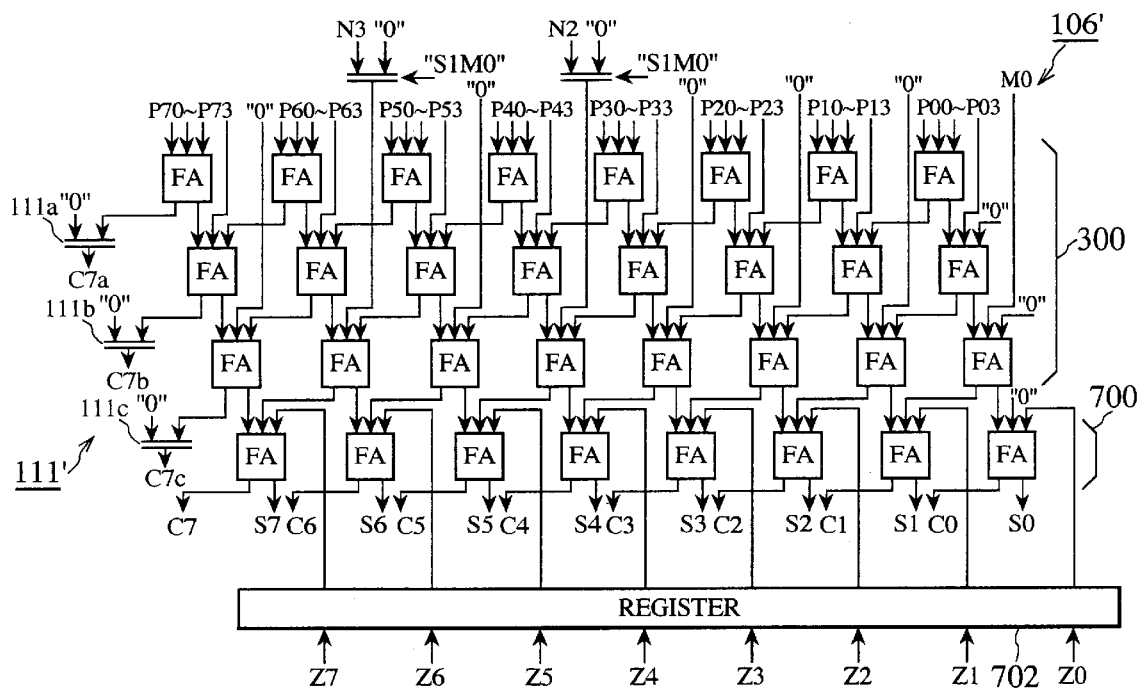
FIGS. 7A and 7B are diagrams each specifically showing a Wallace adder tree included in an arithmetic unit, which calculates a sum of products, according to the third embodiment of the present invention.

FIG. 7A is a block diagram specifically showing a Wallace adder tree 106' employed in the arithmetic unit for calculating a sum of products according to this embodiment. As shown in FIG. 7A, the Wallace adder tree 106', which comprises the Wallace adder tree 106 (FIG. 3) according to the first embodiment, further comprises a full adder group 700 and a register 702. A selector 111' therein includes a selector 111c, in addition to the structure of the selector 111 (FIG. 3) according to the first embodiment.

The register 702 retains a sum of products of the eight least significant bits which has been calculated previously. The full adder group 700 adds the sums of the digits and the carry signals in the eight least significant bits which the full adder group 300 has output, together with the sum of the products which is retained in the register 702, to obtain sums and carry signals. The full adder group 700 then sends the obtained sums and carry signals to the two-input carry adder 108.

The selector 111 c selects either "0" or a carry signal of the full adder which is indicated in the left end of the third upper level in the full adder group 300 shown in FIG. 7A, in accordance with a control signal SIMD, and sends the selected data as a carry signal C7c to the Wallace adder tree 105.

Figure 7B:
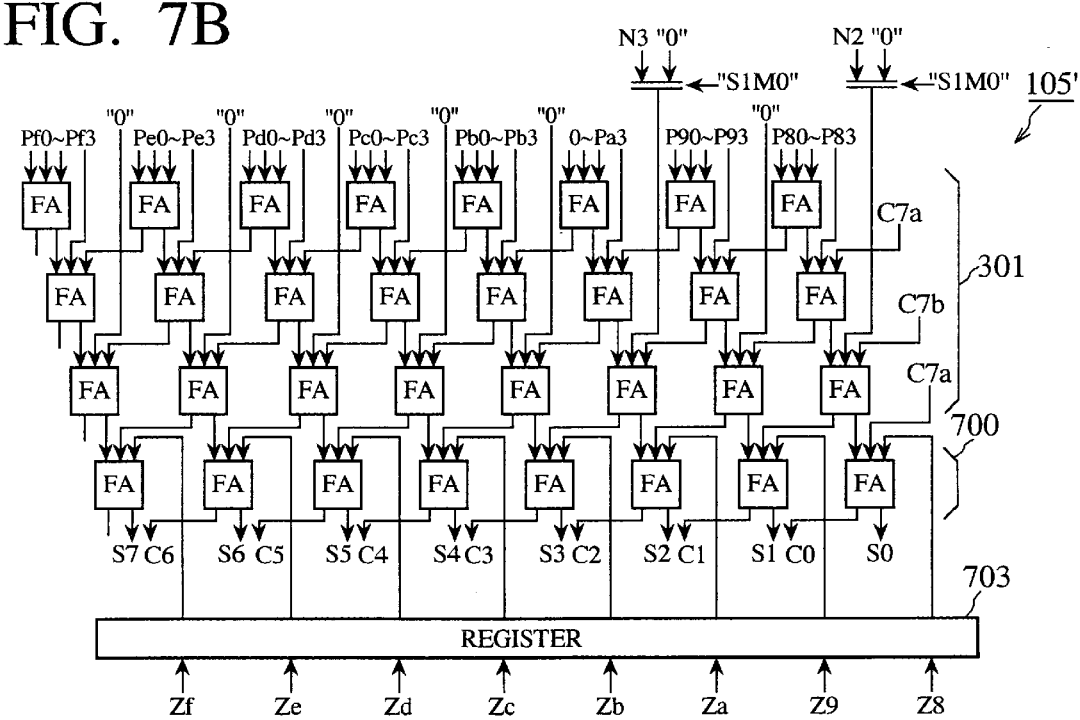
Figure 8:
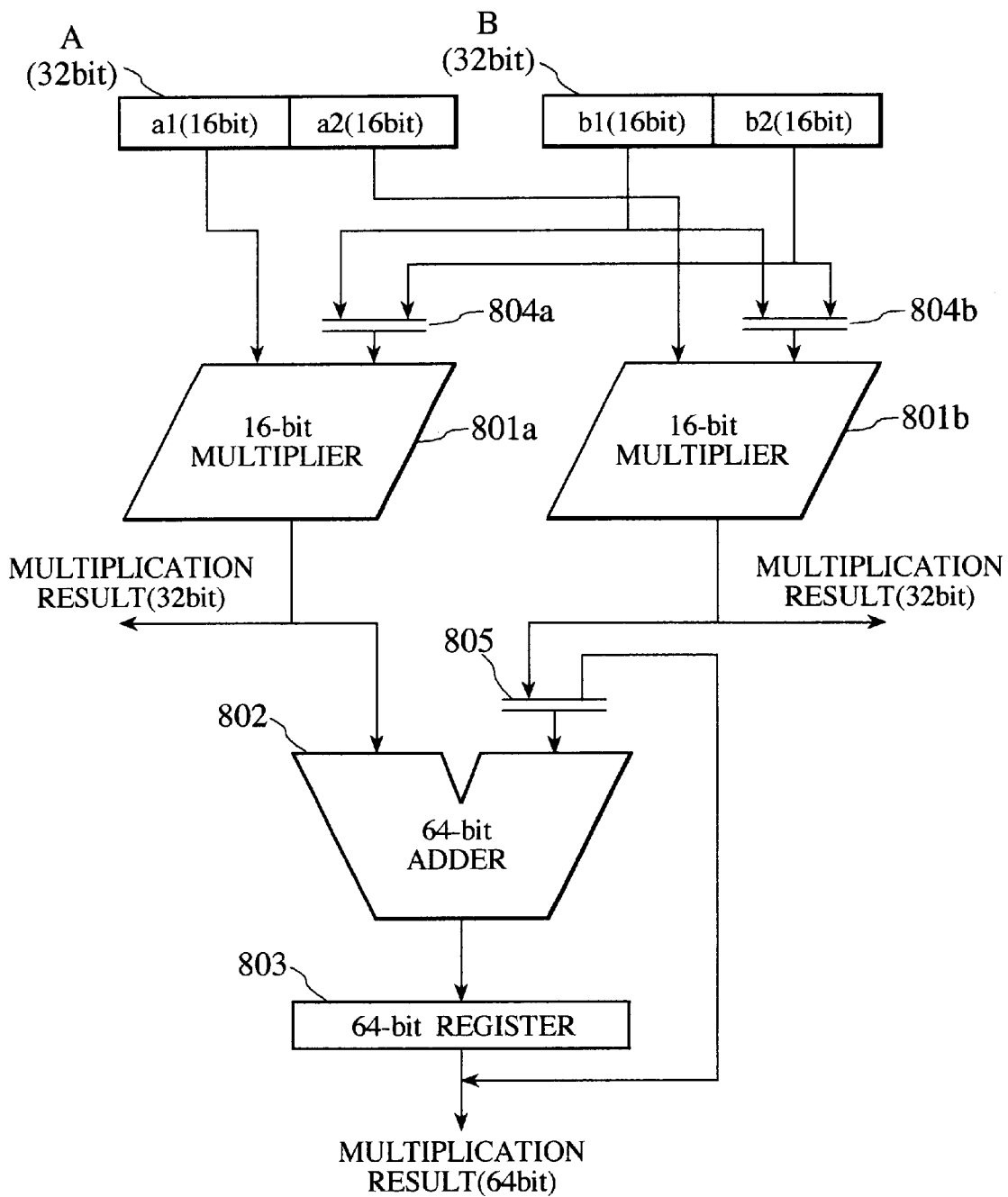
FIG. 8 is a block diagram showing a structure of a multiplier according to the first prior art.
Figure 9:
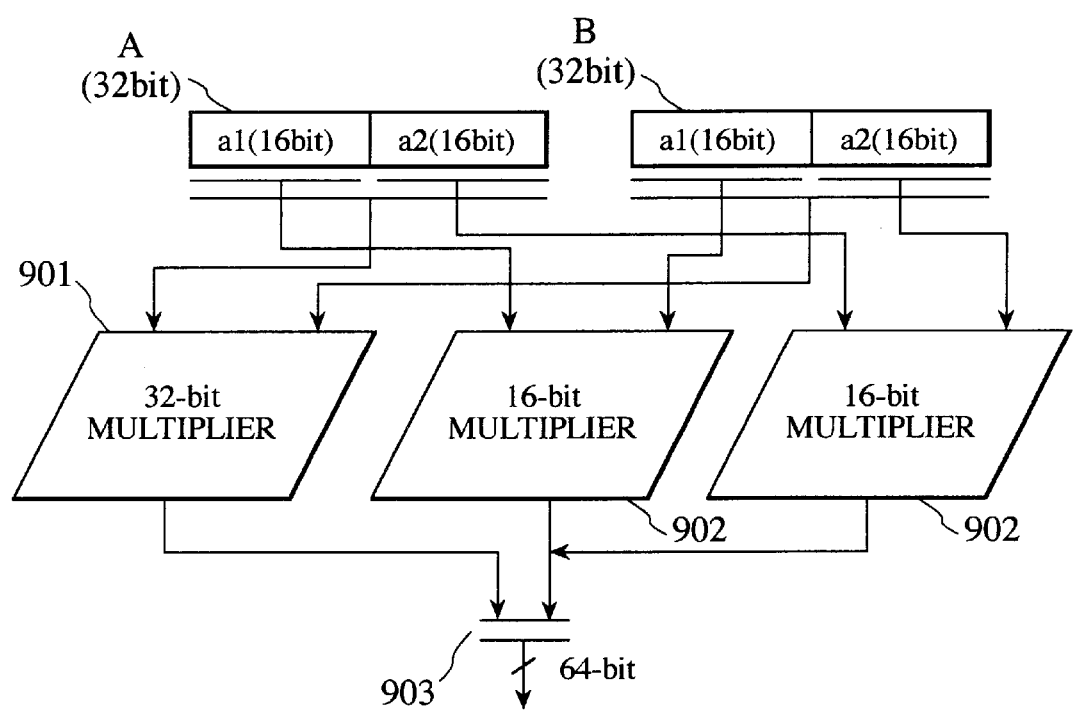
FIG. 9 is a block diagram showing a structure of a multiplier according to the second prior art.

FIG. 7B is a block diagram showing a structure of a Wallace adder tree 105' according to this embodiment. As shown in FIG. 7B, the Wallace adder tree 105' includes the Wallace adder tree 105 (FIG. 3) according to the first embodiment, and further includes a full adder group 701 and a register 703.

The register 703 retains a sum of products of the eight most significant bits which has been calculated previously. The full adder group 701 adds the sums and carry signals of the eight most significant bits which the full adder group 301 has output, together with the sum of the products which is retained in the register 703, to obtain sums and carry signals. The full adder group 700 sends the sums and carry signals of the digits which are obtained in the above-described manner, to the two-input carry adder 107.

Each of the two-input carry adders 108 and 107 adds the sums and carry signals which are obtained by each of the Wallace adder tree 106' and 105', so as to obtain the sum of the products.

As explained above, the arithmetic unit for calculating a sum of products according to this embodiment can carry out an operation for calculating a sum of products with the "eight bit accuracy" and two operations for calculating a sum of products with the "four bit accuracy", employing identical hardware. In applying such an arithmetic unit to a processor, an area of the processor may be reduced. This can attain providing a processor which can be advantageously low in power consumption and manufactured at low cost.

Further, because it is not required to accumulate intermediate results but a sum of products, the arithmetic unit for calculating a sum of products according to this embodiment can obtain a result at high speed in calculating a sum of products, in performing a calculation for obtaining a sum of products with the "eight bit accuracy" and two calculations for obtaining a sum of products with the "four bit accuracy". The arithmetic unit for calculating a sum of products can simultaneously carry out two calculations for obtaining a sum of products with the "four bit accuracy". This results in a short operational time in continuously performing operations for calculating a sum of products with the "four bit accuracy". Accordingly, in applying the arithmetic unit of this embodiment to the processor, such processor can achieve operations at high speed for not only software designed mainly for integer calculations, but software designed mainly for calculations with low accuracy.

Modifications

In the above-described first to third embodiments, it has been noted that each of the partial product generating circuits 101 to 104, and 505 to 509 generates the partial products, which are then added by the Wallace adder trees 105, 106, 511, 512, and the two-input carry adders 107 and 108, in association with one another. However, an arbitrary multiple-input/multiple-output adder, for example, a four-input/two-output adder may be employed for summing the partial products generated by the partial product generating circuits 101 to 104, and 505 to 509.

In the above-described first to third embodiments, the selector 110 selects either "0" or the Y3 bit of the multiplier Y, and outputs the selected data. The selector group 111 selects either "00" or the carry signal output from the Wallace adder tree 106, and outputs the selected data. The selector 112 selects either "0" or the carry signal output from the two-input carry adder 108, and outputs the selected data. The selectors 105a and 106a select either "0" or N3, and output the selected data. The selectors 105b and 106b select either "0" or N2, and output the selected data. The selector group 201a selects either "0000" or the partial bit rows (X3 . . . X0) of the multiplicand X, and outputs the selected data. The selector group 201b selects either (X3, X3, X3, X3) or the partial bit rows (X7 . . . X4) of the multiplicand X, and outputs the selected data. The selector groups 209 to 212 select either bit rows composed of "0", the output data of the inverter group 205, or the output data of the partial multiplier 201, and output the selected data. However, such selectors and selector groups may be replaced with logical circuits. For example, if the control signals SIMD indicating "0" specifies a multiplication operation with the "four bit accuracy", the selectors 110, 111a, 111b, and 112 may be replaced with AND gates for inputting data such as a value "0" and the Y3 bit of the multiplier Y.

In the above-described third embodiment, the Wallace adder trees 105 and 106 (FIGS. 1 and 3) contained in the multiplier according to the first embodiment are replaced with the respective Wallace adder trees 105' and 106', so as to realize the arithmetic unit for calculating a sum of products. Similarly, the Wallace adder trees 511 and 512 contained in the multiplier according to the second embodiment may be replaced likewise the above, so as to realize the arithmetic unit for calculating a sum of products.

In the above-described first to third embodiments, the present invention has been described by referring to the case where the multiplication operation (calculation for obtaining the sum of products) with the "eight bit accuracy" or where the two multiplication operations (calculation for obtaining the sum of products) with the "four bit accuracy", by way of example. However, in the present invention, the bit number of a multiplier and a multiplicand, that is, the accuracy of the multiplication operation is not limited to the examples in the above-described embodiments. The present invention is applicable to a multiplier (an arithmetic unit for calculating a sum of products) which executes, for example, both of the multiplication operation (arithmetic operation for obtaining a sum of products) with "thirty two bit accuracy" and the multiplication operation (arithmetic operation for obtaining a sum of products) with "eight bit accuracy".

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. H10-242754 filed on Aug. 28, 1998, including specification, claims, drawings and summary. The disclosure of the above Japanese Patent Application is incorporated herein by reference in its entirety.

What is claimed is:

1. A multiplier for executing a multiplication operation using a Booth's algorithm, comprising:

a Booth decoder which divides a multiplier (Y) into a plurality of partial bit rows and outputs the divided bit rows;

a first multiplier replacing circuit which replaces, with "0", a value of only a most significant bit (Y3) included in least significant half of bits of the multiplier (Y) in accordance with a first control signal (SIMD), so as to replace, with 0, a predetermined bit included in the plurality of bit rows;

a plurality of partial product generating circuits each of which is arranged in a manner corresponding to each corresponding one of the partial bit rows divided by said Booth decoder, and generates a partial product, represented in bits which are twice as many as a bit number of a multiplicand (X), of the multiplicand (X) and each corresponding partial bit row;

a first adder which adds bit rows including the least significant half of bits of the partial products generated by said plurality of partial product generating circuits;

a second adder which adds bit rows including most significant half of bits of the partial products generated by said plurality of partial product generating circuits, in consideration of one or more carry signals; and a carry selecting circuit which selects either a bit row composed of "0s" or one or more carry signals which said first adder outputs, in accordance with the first control signal (SIMD), and supplies, to said second adder, the selected data as one or more carry signals, wherein each of said partial product generating circuits, which generates the partial product corresponding to the least significant half the bits included in the partial bit rows divided by said Booth decoder, generates either partial product of full bits of the multiplicand (X) and each corresponding partial bit row or of least significant half of bits of the multiplicand (X) and each corresponding bit row in accordance with a first select signal (SIMD), and each of said partial product generating circuits, which generates the partial product corresponding to the most significant half the bits included in the partial bit rows divided by said Booth decoder, generates either partial product of fill bits of the multiplicand (X) and each corresponding partial bit row or of the most significant half the bits of the multiplicand (X) and each corresponding bit row in accordance with the control signal (SIMD).

2. The multiplier according to claim 1, wherein:

each of said partial product generating circuits which generates the partial product corresponding to the least significant half the bits included in the partial bit rows divided by said Booth decoder comprises a first multiplicand replacing circuit which replaces each of the most significant half the bits of the multiplicand (X) with a value of a most significant bit included in the least significant half the bits in accordance with the first control signal (SIMD), partial product replacing circuits each of which replaces, with "0", each value of the most significant half the bits representing as a multiplication result in which the multiplicand (X) is multiplied by each corresponding partial bit row, in accordance with the first control signal (SIMD); and each of said partial product generating circuits which generates the partial product corresponding to the most significant half the bits included in the partial bit rows divided by said Booth decoder comprises a second multiplicand replacing circuit which replaces, with "0", each value of the least significant half the bits of the multiplicand (X) in accordance with the first control signal (SIMD).

3. The multiplier according to claim 2, wherein:

the first control signal (SIMD) is to indicate either multiplication operation of obtaining, with high accuracy, a product of a value represented in full bits of the multiplier and a value represented in full bits of the multiplicand, or of obtaining, with low accuracy, a product of a value represented in the most significant half the bits of the multiplier and a value represented in the most significant half the bits of the multiplicand and a product of a value represented in the least significant half the bits of the multiplier and a value represented in the most significant half the bits of the multiplicand;

said first multiplier replacing circuit replaces, with "0", a value of the most significant bit (Y3) included in one bit row of the least significant half the bits of the multiplier (Y), when the first control signal indicates a multiplication operation with low accuracy;

said first multiplicand replacing circuit replaces each of the most significant half the bits of the multiplicand (X) with a value of a most significant bit included in the least significant half the bits, when the first control signal indicates a multiplication operation with low accuracy;

each of said partial product replacing circuits replaces, with "0", each value of the most significant half the bits of a multiplication result in which the multiplicand (X) is multiplied by each corresponding partial bit row, when the first control signal indicates a multiplication operation with low accuracy;

said second multiplicand replacing circuit replaces, with "0", each value of the least significant half the bits of the multiplicand (X), when the control signal indicates a multiplication operation with low accuracy; and each of said carry selecting circuits selects and outputs the carry signals output by said first adder, when the first control signal (SIMD) indicates a multiplication operation with high accuracy, and selects and outputs the bit row composed of "0", when the first control signal (SIMD) indicates a multiplication operation with low accuracy.

4. The multiplier according to claim 1, wherein:

said first adder comprises a first Wallace adder tree which calculates sum signals and carry signals of digits of the partial products generated by said plurality of partial product generating circuits, and a first carry adder which adds the sum signals and the carry signals of the digits of the partial products which are calculated by said first Wallace adder tree, in a manner corresponding to each digit;

said second adder comprises a second Wallace adder tree which calculates sum signals and carry signals of digits of the partial products generated by said plurality of partial product generating circuits, in consideration of the carry signals, and a second carry adder which adds the sum signals and the carry signals of the digits of the partial products which are calculated by said second Wallace adder tree, in a manner corresponding to each digit, in consideration of the carry signals; and said carry selecting circuit comprises one or more selectors which select either "0" or a carry signal of one or more digits which said first Wallace adder tree outputs, and supply selected data to said second Wallace adder tree, and a selector which selects either "0" or the carry signal which said first carry adder outputs, and supplies selected data to said second carry adder.

5. The multiplier according to claim 1, further comprising a second multiplier replacing circuit which replaces, with "0", a value of a predetermined bit of the multiplier (Y) in accordance with a second control signal (FUGOU-UMU) indicating whether to handle the multiplier (Y) and the multiplicand (X) as including a sign or not including any sign, so as to replace, with "0", one or more values of one or more predetermined bits included in the plurality of partial bit rows, wherein said plurality of partial product generating circuits generate either partial product of the multiplicand which is handled as a value with including a sign or of the multiplicand which is handled as a value without including any sign.

6. The multiplier according to claim 5, wherein:

each of said partial product generating circuits which generates the partial product corresponding to the least significant half the bits included in the partial bit rows which are divided by said Booth decoder includes a third multiplicand replacing circuit which replaces each of the most significant half the bits of the multiplicand with a value of the most significant bit included in the least significant half the bits or with the bit row composed of "0", in accordance with the first and the second control signals, and a first multiplicand expanding circuit which expands the multiplicand in its bit number by adding the multiplicand together with the bit row composed of "0" or a value of the most significant bit of the multiplicand in accordance with the second control signal; and each of said partial product generating circuits which generates the partial product corresponding to the most significant half the bits included in the partial bit rows divided by said Booth decoder includes a fourth multiplicand replacing circuit which replaces, with "0", each value of the least significant half the bits of the multiplicand (X) in accordance with the first control signal, and a second multiplicand expanding circuit which expands the multiplicand in its bit number by adding the multiplicand together with the bit row composed of "0" or a value of the most significant bit of the multiplicand in accordance with the second control signal.

7. The multiplier according to claim 6, wherein:

said second multiplier replacing circuit replaces, with "0", a value of a predetermined value (Y3) of the multiplier (Y), when the second control signal (FUGOU) indicates to handle the multiplier and the multiplicand as including a sign;

said third multiplicand replacing circuit replaces each of the most significant half the bits of the multiplicand with a value of the most significant bit included in the least significant half the bits, when the first control signal indicates a multiplication operation with low accuracy and the second control signal indicates to handle the multiplier and the multiplicand as including a sign, and replaces each of the most significant half the bits of the multiplicand with the bit row composed of "0", when the first control signal indicates a multiplication operation with low accuracy and the second control signal indicates to handle the multiplier and the multiplicand as not including any sign;

said fourth multiplicand replacing circuit replaces, with "0", each value of the least significant half the bits of the multiplicand (X), when the first control signal indicates a multiplication operation with low accuracy; and said first and the second multiplicand expanding circuits expands the multiplicand in its bit number by adding the multiplicand with the bit row including a value of the most significant bit of the multiplicand, when the second control signal indicates to handle the multiplier and the multiplicand as including a sign, and expands the multiplicand in its a bit number by adding the multiplicand with the bit row composed of "0", when the second control signal indicates to handle the multiplier and the multiplicand as not including any sign.

8. An arithmetic unit which obtains a sum of products and adds multiplication results executed with using a Booth's algorithm, comprising:

a Booth decoder which divides a multiplier (Y) into a plurality of partial bit rows and outputs the divided partial bit rows;

a first multiplier replacing circuit which replaces, with "0", a value of only a most significant bit (Y3) included in least significant half of bits of a multiplier the multiplier (Y) in accordance with a first control signal (SLID), so as to replace, with "0", a predetermined bit included in the plurality of the partial bit rows, a plurality of partial product generating circuits, each of which is arranged in a manner corresponding to each corresponding one of the partial bit rows divided by said Booth decoder, each of which generates a partial product, represented in bits which are twice as many as a bit number of the multiplicand (X), of a multiplicand (X and each partial bit row;

a first sum-of-product retaining circuit which retains a sum of products corresponding to the least significant half the bits of the partial products generated by the plurality of partial product generating circuits;

a second sum-of-product retaining circuit which retains a sum of products which has been corresponding to most significant half of bits of the partial products generated by the plurality of partial product generating circuits;

a first adder which adds the bit rows of the least significant half the bits of the partial products generated by the plurality of partial product generating circuits, together with the sum of the products which is retained by said first sum-of-product retaining circuit;

a second adder which adds the bit rows of the most significant half the bits of the partial products generated by the plurality of partial product generating circuits, together with the sum of the products which is retained by said second sum-of-product retaining circuit, in consideration of a carry signal; and carry selecting circuits each of which selects either a carry signal output by said first adder or a bit row composed of "0" in accordance with the first control signal (SIMD), and supplies the selected data as one or more carry signals to said second adders, wherein each of said partial product generating circuits, which generates the partial product corresponding to the least significant half the bits of the partial bit rows divided by said Booth decoder, generates either partial product of each corresponding partial bit row and full bits of the multiplicand (X) or of each corresponding bit row and the least significant half the bits of the multiplicand (X) in accordance with a first select signal (SIMD), and each of said partial product generating circuits, which generates the partial product corresponding to the most significant half the bits of the partial bit rows divided by said Booth decoder, generates either partial product of each corresponding partial bit row and full bits of the multiplicand (X) or of each corresponding partial bit row and the most significant half the bits of the multiplicand (X) in accordance with the first control signal (SIMD).

9. The arithmetic unit which obtains a sum of products according to claim 8, wherein:
   each of said partial product generating circuits, which generates the partial product corresponding to the least significant half the bits included in the partial bit rows divided by said Booth decoder, includes
      a first multiplicand replacing circuit which replaces each of the most significant half the bits of the multiplicand (X) with a value of a most significant bit included in the least significant half the bits, in accordance with the first control signal (SIMD),
      partial product replacing circuits which replaces, with "0", each value of the most significant half the bits representing a multiplication result in which the multiplicand (X) is multiplied by each bit row corresponding in accordance with the first control signal (SIMD); and
   each of said partial product generating circuits, which generates the partial product corresponding to the most significant half the bits included in the partial bit rows divided by said Booth decoder, includes
      a second multiplicand replacing circuit which replaces, with "0", each value of the least significant half the bits of the multiplicand (X) in accordance with the first control signal (SIMD).

10. The arithmetic unit which obtains a sum of products according to claim 9, wherein:
   the first control signal (SIMD) is to indicate either multiplication operation of calculating, with high accuracy, a product of a value represented in full bits of the multiplier and a value represented in full bits of the multiplicand, or of calculating, with low accuracy, a product of a value represented in the most significant half the bits of the multiplier and a value represented in the most significant half the bits of the multiplicand and a product of a value represented in the least significant half the bits of the multiplier and a value represented in the most significant half the bits of the multiplicand;
   said first multiplier replacing circuit selects and outputs "0", when the first control signal indicates a multiplication operation with low accuracy;
   said first multiplier replacing circuit replaces each of the most significant half the bits of the multiplier (X) with a value of a most significant bit included in the least significant half the bits, when the first control signal indicates a multiplication operation with low accuracy;
   each of said partial product replacing circuits replaces, with "0", each value of the most significant half the bits of a multiplication result in which the multiplicand (X) is multiplied by each corresponding partial bit row, when the first control signal indicates a multiplication operation with low accuracy;
   said second multiplicand replacing circuit replaces, with "0", the least significant half the bits of the multiplicand (X), when the first control signal indicates a multiplication operation with low accuracy; and
   said carry selecting circuit selects and outputs carry signals which said first adder outputs, when the first control signal (SIMD) indicates a multiplication operation with high accuracy, and selects and outputs the bit row composed of "0", when the first control signal (SIMD) indicates a multiplication operation with low accuracy.

11. The arithmetic unit which obtains a sum of products according to claim 8, further comprising a second multiplier replacing circuit which replaces, with "0", a value of a predetermined bit of the multiplier (Y), in accordance with a second control signal (FUGOU-UMU) indicating whether to handle the multiplier (Y) and multiplicand (X) as including or not including a sign, so as to replace one or more values of one or more predetermined bits included in the plurality of partial bit rows, with "0",
   wherein each of said plurality of partial product generating circuits generates either partial product of a multiplicand which is handled as including a sign or of a multiplicand which is handled as not including any sign, in accordance with the second control signal.

12. The arithmetic unit which obtains a sum of products according to claim 11, wherein:
   each of said partial product generating circuits, which generates the partial product corresponding to the least significant half the bits included in the partial bit rows divided by said Booth decoder, includes
      a third multiplicand replacing circuit which replaces each of the most significant half the bits of the multiplicand with the bit row composed of "0" or a value of a most significant bit included in the least significant half the bits, and
      a first multiplicand expanding circuit which expands the multiplicand in its bit number by adding the multiplicand with the bit row composed of "0" or a value of a most significant bit of the multiplicand in accordance with the second control signal; and
   each of said partial product generating circuit, which generates the partial product corresponding to the most significant half the bits included in the partial bit rows divided by said Booth decoder, includes
      a fourth multiplicand replacing circuit which replaces, with "0", each value of the least significant half the bits of the multiplicand (X) in accordance with the first control signal, and
      a second multiplicand expanding circuit which expands the multiplicand in its bit number by adding the multiplicand with the bit row composed of "0" or including a value of a most significant bit of the multiplicand in accordance with the second control signal.

13. The arithmetic unit which obtains a sum of products according to claim 12, wherein:
   said second multiplicand replacing circuit replaces, with "0", a value of a predetermined bit (Y3) of the multiplier (Y), when the second control signal (FUGOU) indicates to handle the multiplier and the multiplicand as including a sign;
   said third multiplicand replacing circuit
      replaces each of the most significant half the bits of the multiplicand with a value of a most significant bits included in the least significant half the bits, when the first control signal indicates a multiplication operation with low accuracy and the second control signal indicates to handle the multiplier and the multiplicand as including a sign, and
      replaces each of the most significant half the bits of the multiplicand with the bit row composed of "0", when the first control signal indicates a multiplication operation with low accuracy and the second control signal indicates to handle the multiplier and the multiplicand as not including any sign;

said fourth multiplicand replacing circuit replaces, with "0", each value of the least significant half the bits of the multiplicand (X), when the first control signal indicates a multiplication operation with low accuracy; and each of said first and second multiplicand expanding circuits expands the multiplicand in its bit number by adding the multiplicand with the bit row including a value of the most significant bit of the multiplicand, when the second control signal indicates to handle the multiplier and the multiplicand as including a sign, and expands the multiplicand in its bit number by adding the multiplicand with the bit row composed of "0", when the second control signal indicates to handle the multiplier and the multiplicand as not including any sign.

14. A multiplication method for carrying out a multiplication operation using a Booth's algorithm, comprising:

dividing a multiplier (Y) into a plurality of partial bit rows; replacing, with "0", a value of only a most significant bit (Y3) included in least significant half of bits of the multiplier (Y) in accordance with a first control signal (SIMD), so as to replace, with "0", a predetermined bit included in the plurality of partial bit rows;

parallelly generating partial products, represented in bits which are twice as many as a bit number of the multiplicand (X), of a multiplicand (X) and each corresponding one of the partial bit rows;

adding the bit rows of the least significant half the bits of the generated partial products;

selecting, as a carry signal, either a carry signal generated by an addition result of the bit rows of the least significant half the bits of the partial products or a bit row composed of "0", in accordance with the first control signal (SIMI); and adding the bit rows of most significant half the bits of each partial product, in consideration of a carry signal;

wherein said generating the partial products can be performed by generating either partial product of full bits of the multiplicand (X) and each corresponding partial bit row or of the least significant half the bits of the multiplicand (X) and each corresponding bit row, in accordance with a first select signal (SIMD), in a case of generating a partial product of the multiplicand (X3 and each partial bit row of the least significant half the bits, and generating either partial product of full bits of the multiplicand (X) and each corresponding partial bit row or of the most significant half the bits of the multiplicand (X) and each corresponding bit row, in accordance with the first select signal (SIMD), in a case of generating a partial product of the multiplicand (X) and each corresponding partial bit row of the most significant half the bits.

15. A multiplication method for calculating a product of values represented by full bits of a multiplier and a multiplicand both capable of being divided into an identical number of blocks with each other, or a product of values each represented by a corresponding bit block, said method comprising:

dividing a multiplier into a plurality of partial bit rows, replacing, with "0", a value of only a most significant bit included in each block of the multiplier in accordance with a first control signal, so as to replace a predetermined bit included in the plurality of partial bit rows, with "0";

parallelly generating a partial product, represented in bits which are twice as many as a bit number of a multiplicand, of the multiplicand (X) and each corresponding one of the partial bit rows;

dividing each of the generated partial products into number of predetermined blocks which is identical with number of the blocks of the multiplier and the multiplicand, and adding bits which belong to an identical block; and selecting, in a case of adding the partial products represented in each block, either a carry signal or "0", and inputting the selected data as one or more carry signals, wherein said generating the partial products can be performed by generating either partial product of full bits of the multiplicand and each corresponding bit row or of any block of the multiplicand and each corresponding bit row, in accordance with the first control signal.

16. A method for obtaining a sum of products and for adding a multiplication result executed with using a Booth's algorithm, comprising:

dividing a multiplier (Y) into a plurality of partial bit rows;

replacing, with "0", a value of only a most significant bit (Y3) included in the partial bit row of least significant half of bits of a multiplier (Y) in accordance with a first control signal (SIMD), so as to replace a predetermined bit included in the plurality of partial bit rows, with "0";

parallelly generating partial products, represented in bits which are twice as many as a bit number of a multiplicand, of the multiplicand (X) and each corresponding one of the partial bit rows;

adding bit rows of the least significant half the bits of the generated partial products, together with so-far-obtained sums of products corresponding to the least significant half the bits;

selecting as a carry signal, either "0" or a carry signal which is generated by an addition result of the so-far-obtained sums of products corresponding to the bit row of the least significant half the bits of the partial products and corresponding to the least significant half the bits, in accordance with the first control signal (SIMD);

adding the bit row of most significant half the bits of the generated partial products, together with the so-far-obtained sum of the products corresponding to the most significant half the bits, in consideration of a carry signal; and retaining a newly-calculated sum of the products, as the addition result of adding the least significant half and the most significant half the bits, wherein said generating the partial products can be performed by generating either partial product of full bits of the multiplicand (X) and each corresponding one of the partial bit rows or of the least significant half the bits of the multiplicand (X) and each corresponding one of the partial bit rows in accordance with a first select signal, in a case of generating a partial product of the multiplier (X) and the partial bit row of the least significant half the bits, and generating either partial product of full bits of the multiplicand (x) and each corresponding one of the partial bit rows or of the most significant half the bits of the multiplicand (X) and each corresponding one of the bit rows in accordance with the first select signal, in a case of generating a partial product of the multiplier (X) and the partial bit row of the most significant half the bits.

17. A multiplication method for obtaining a sum of products and for sequentially adding a product of values represented by full bits of a multiplier and a multiplicand both capable of being divided into an identical number of blocks with each other, or a product of values each represented by a corresponding bit block, said method comprising:

dividing the multiplier into a plurality of partial bit rows;

replacing, with "0", a value of only a most significant bit included in each block of the multiplier in accordance with a first control signal, so as to replace a predetermined bit included in the plurality of partial bit rows, with "0";

parallelly generating partial products, each represented in bits which are twice as many as a bit number of the multiplicand (X), of the multiplicand (X) and each corresponding one of the partial bit rows;

dividing each of the generated partial products, into number of predetermined blocks which is identical with number of the blocks of the multiplier and the multiplicand, and adding the block of each of the partial product and a so-far-calculated sum of the products of the blocks, together with bits which belong to an identical block;

selecting either a carry signal or "0" in accordance with the first control signal, and inputting the selected data as a carry signal, in a case of adding the partial products of the blocks; and retaining a newly calculated sum of products, as an addition result of the blocks, wherein said generating the partial products can be performed by generating either partial product of full bits of the multiplicand and each corresponding one of the partial bit rows or of any block of the multiplicand and a corresponding one of the bit rows, in accordance with the first control signal.

* * * * *